April 27, 1971  T. W. MILLIGAN ET AL  3,576,626
PHOTOGRAPHIC COLOR DIFFUSION TRANSFER PROCESSES
AND FILM UNIT FOR USE THEREIN
Filed Oct. 7, 1969  10 Sheets-Sheet 2
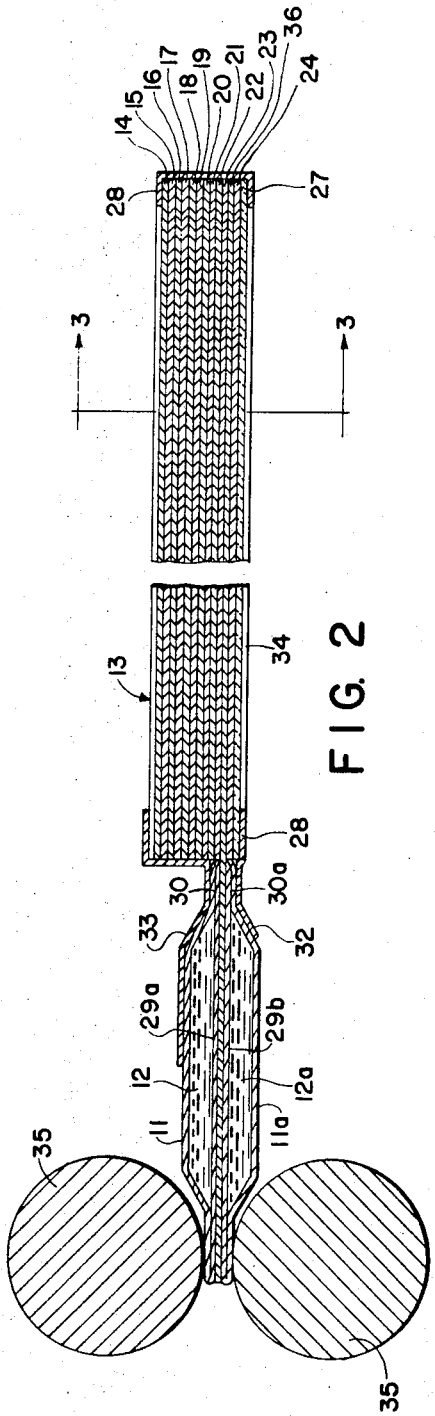
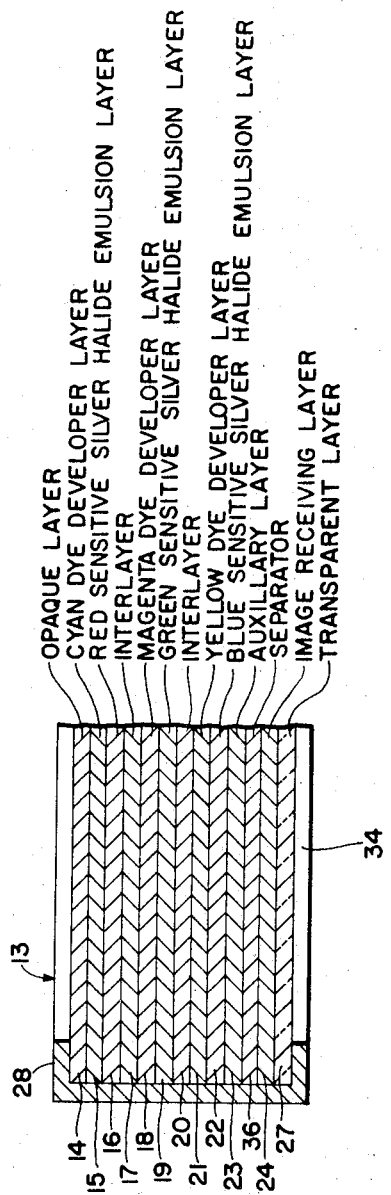
INVENTORS
TERRY W. MILLIGAN
and
BY  RICHARD W. YOUNG
Brown and Mikulka
and
Ann G. Leibowitz
ATTORNEYS

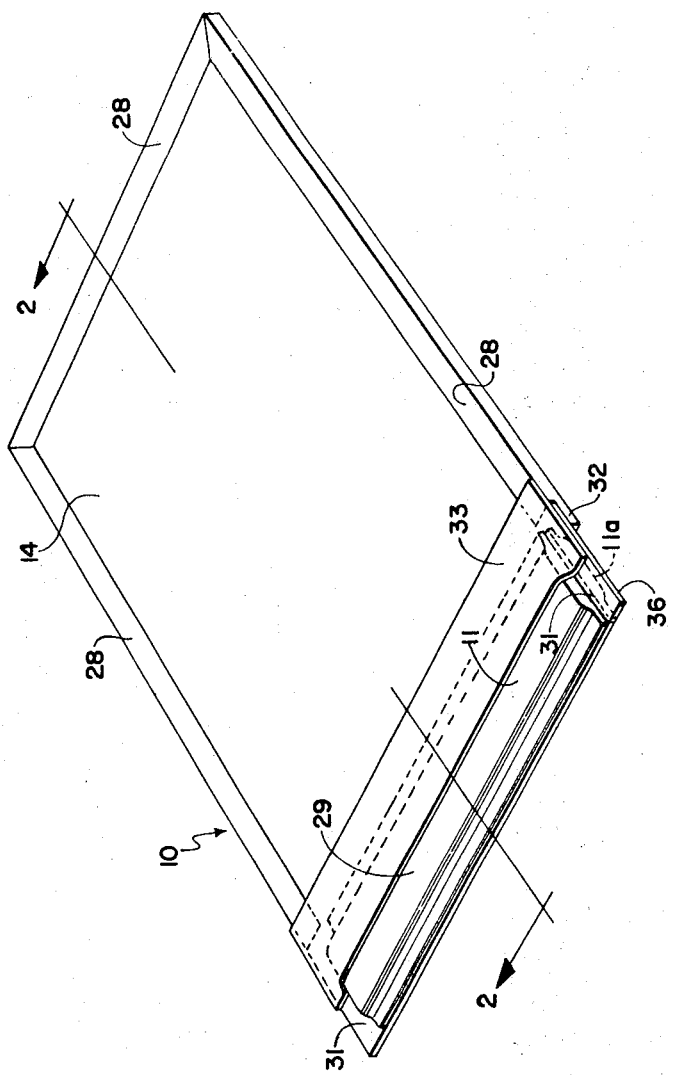

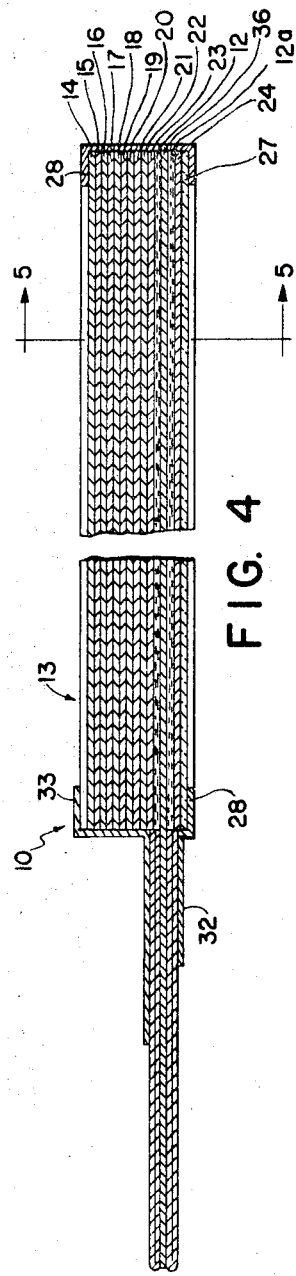
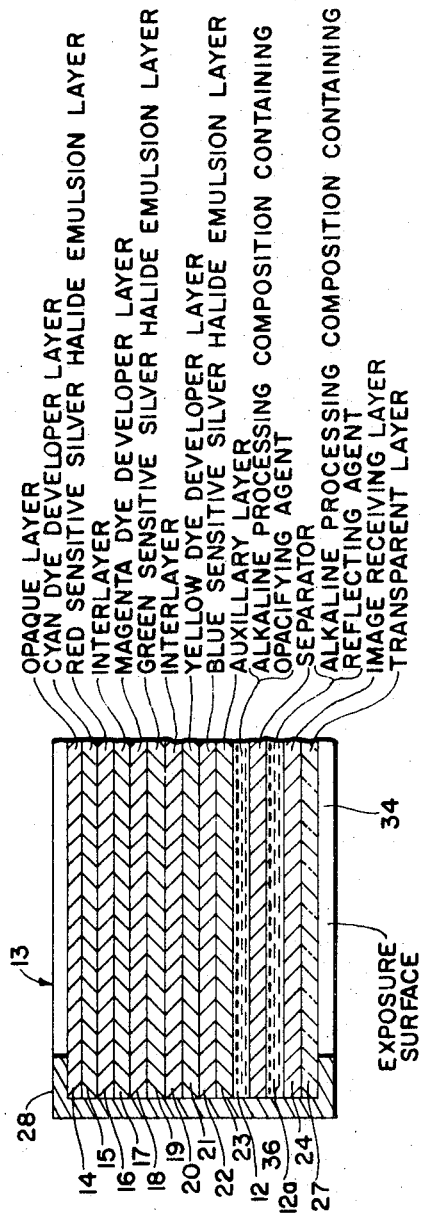
FIG. 4
FIG. 5

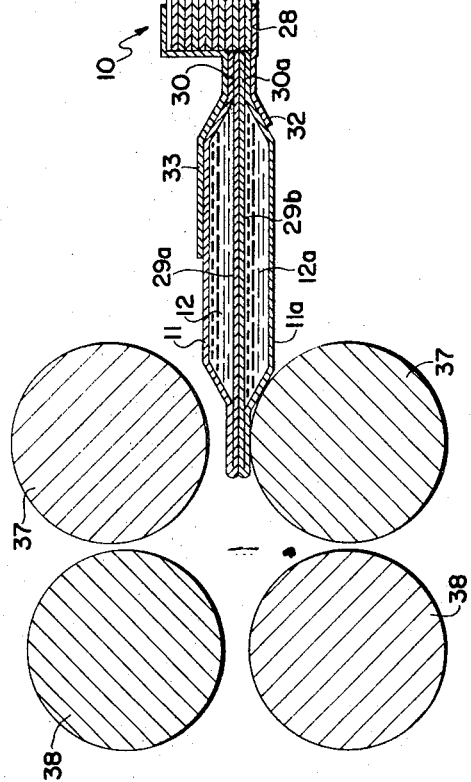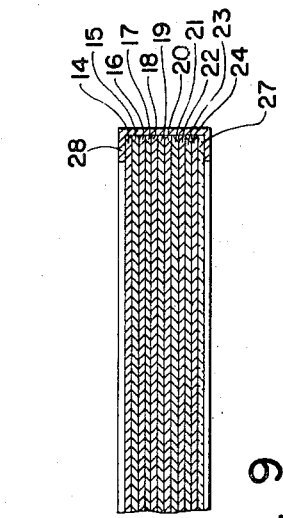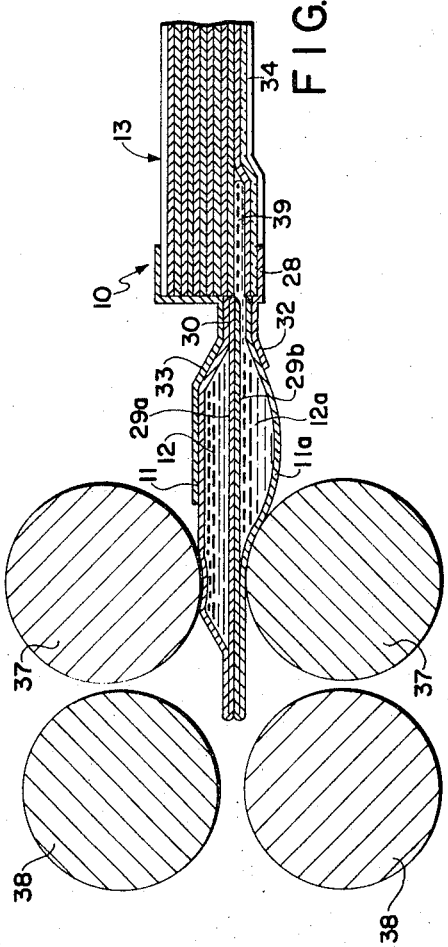

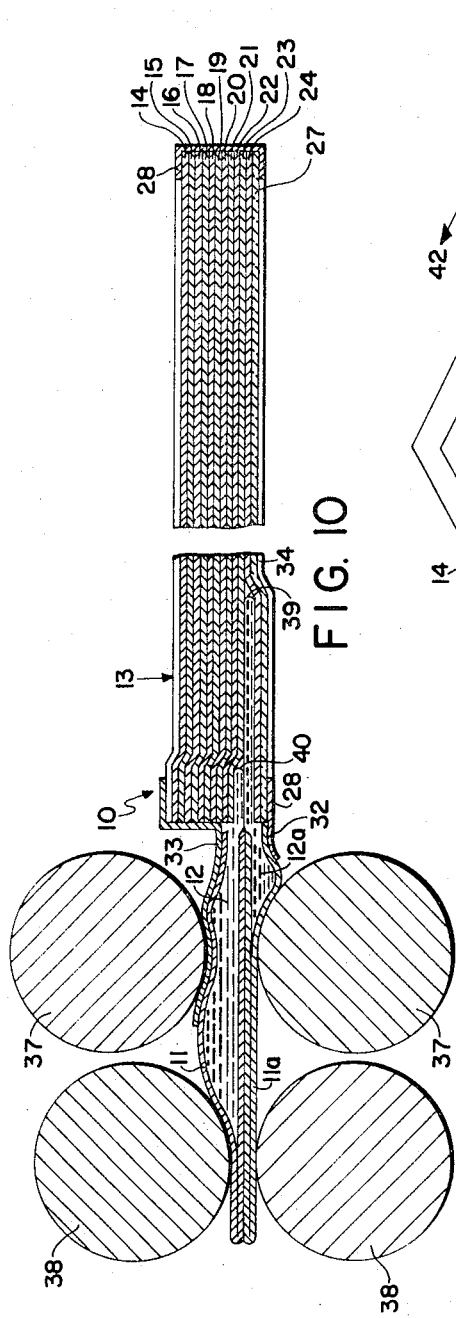
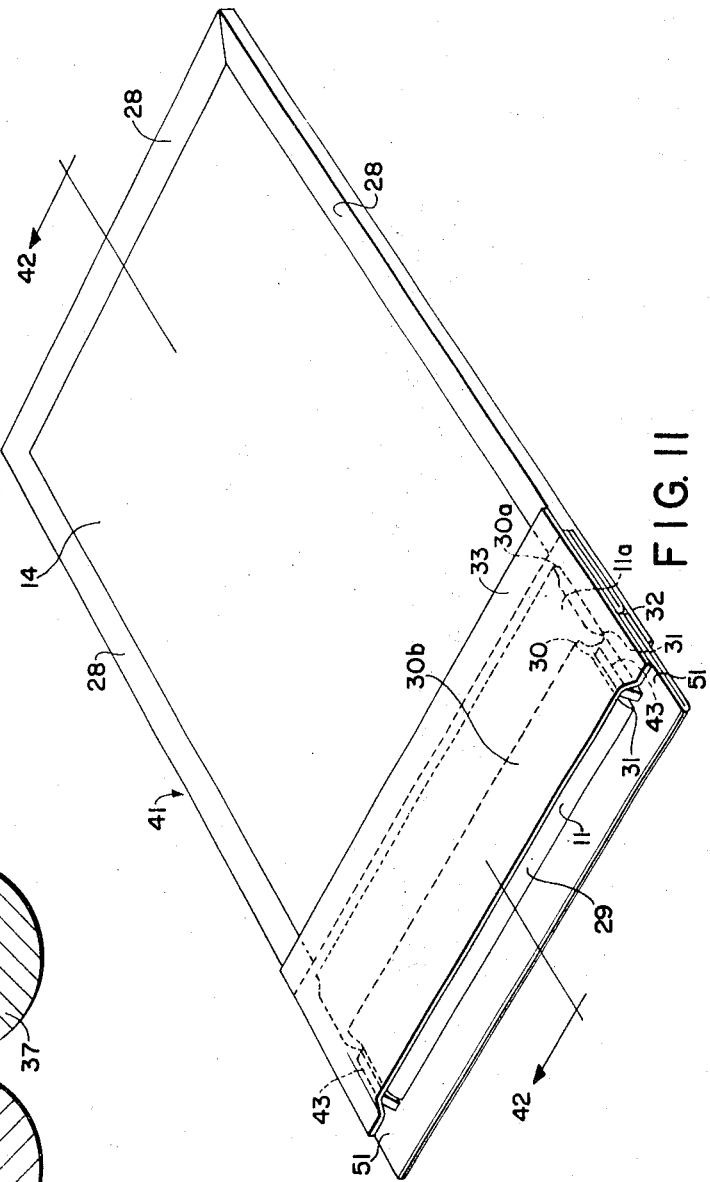

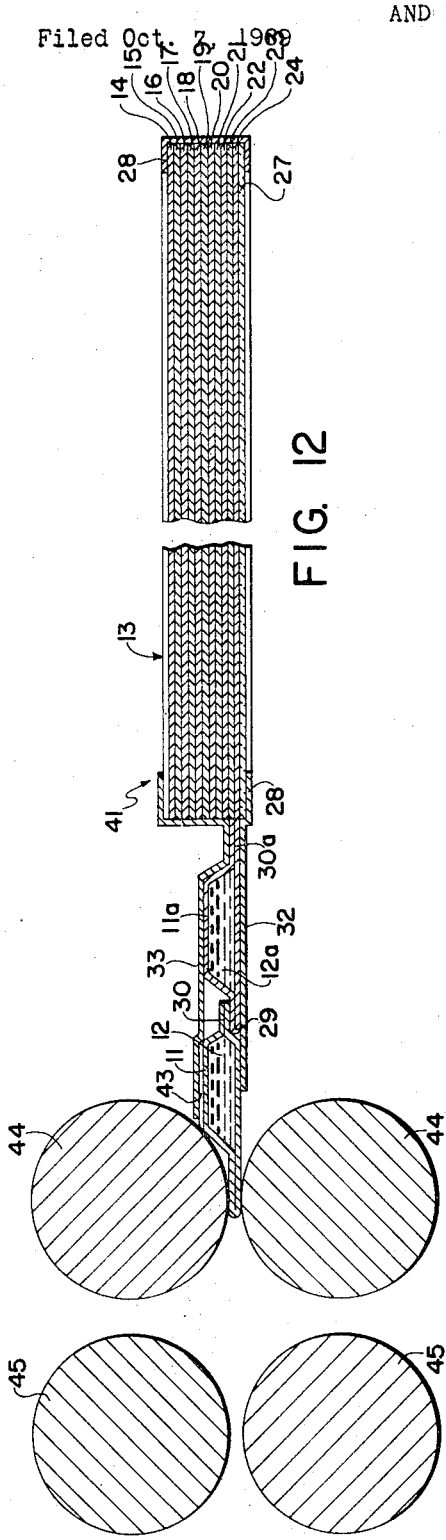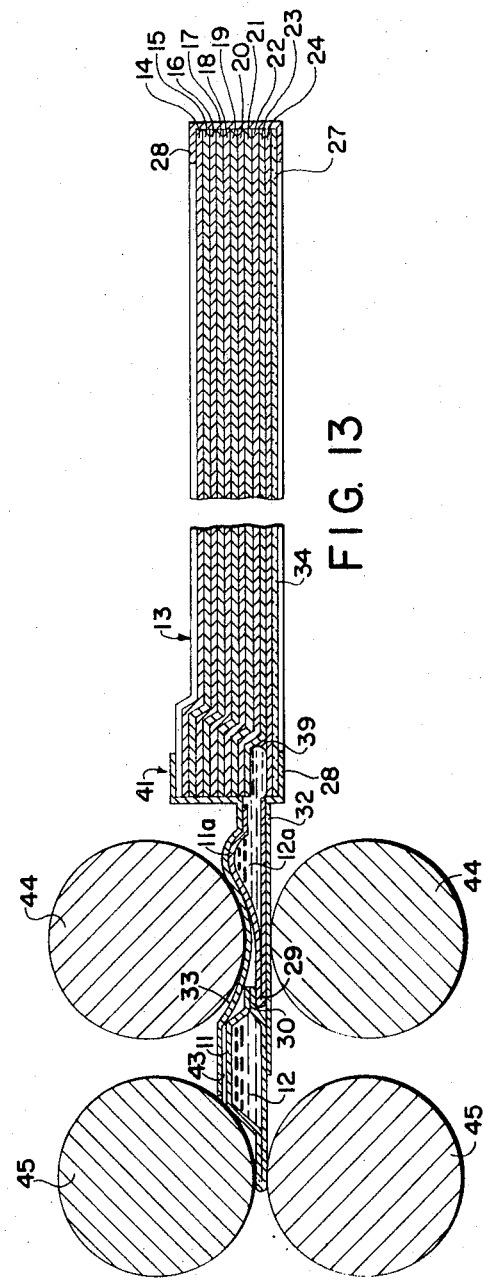

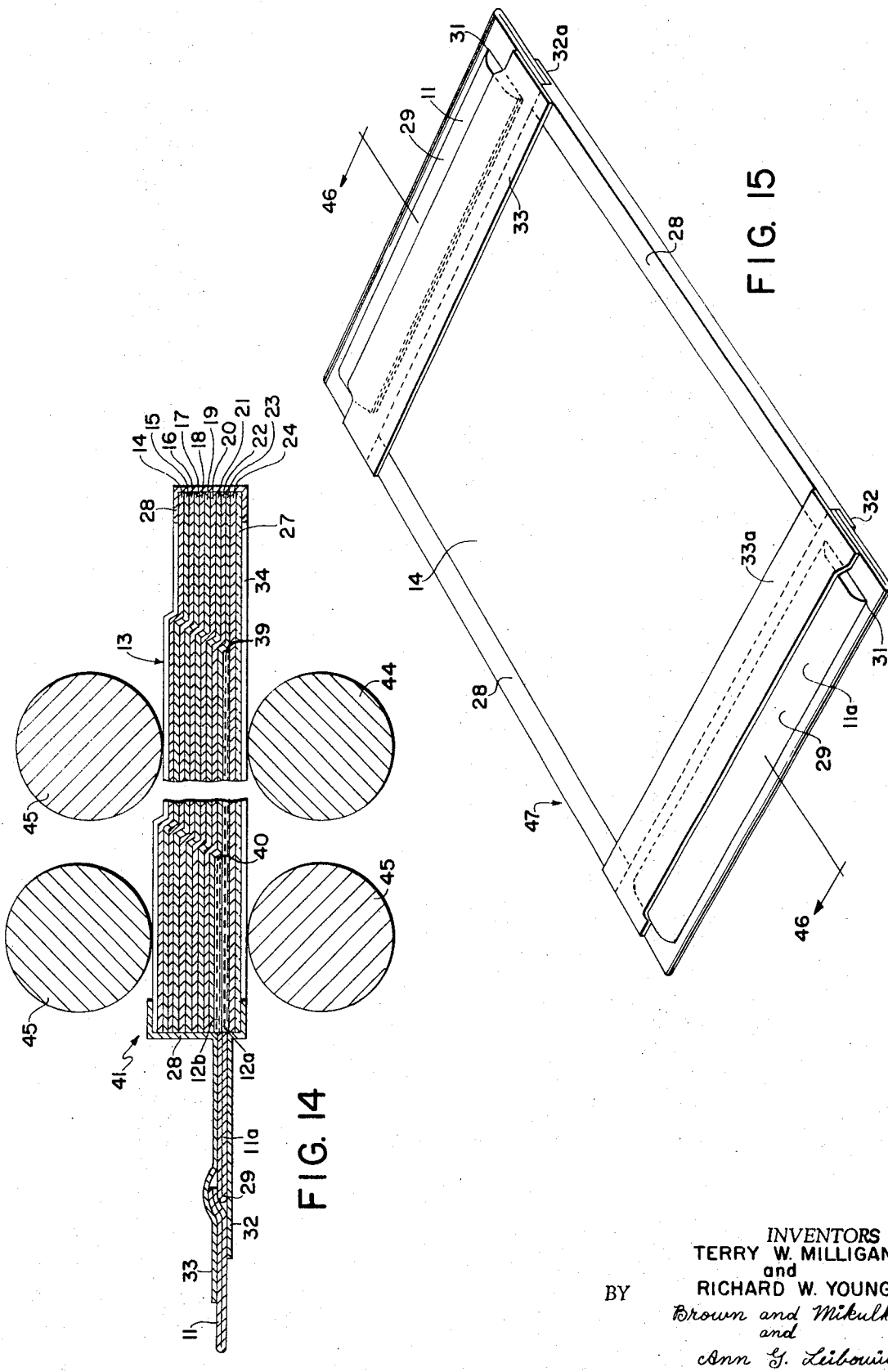

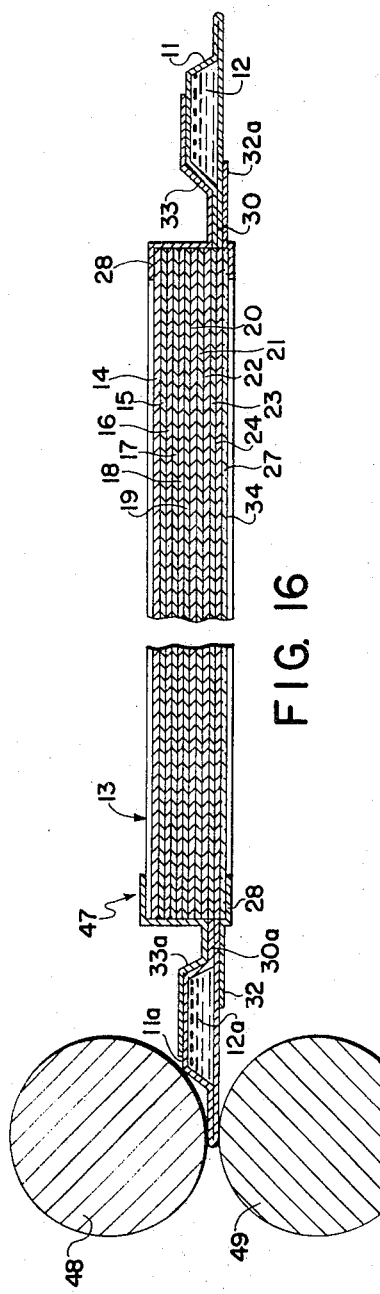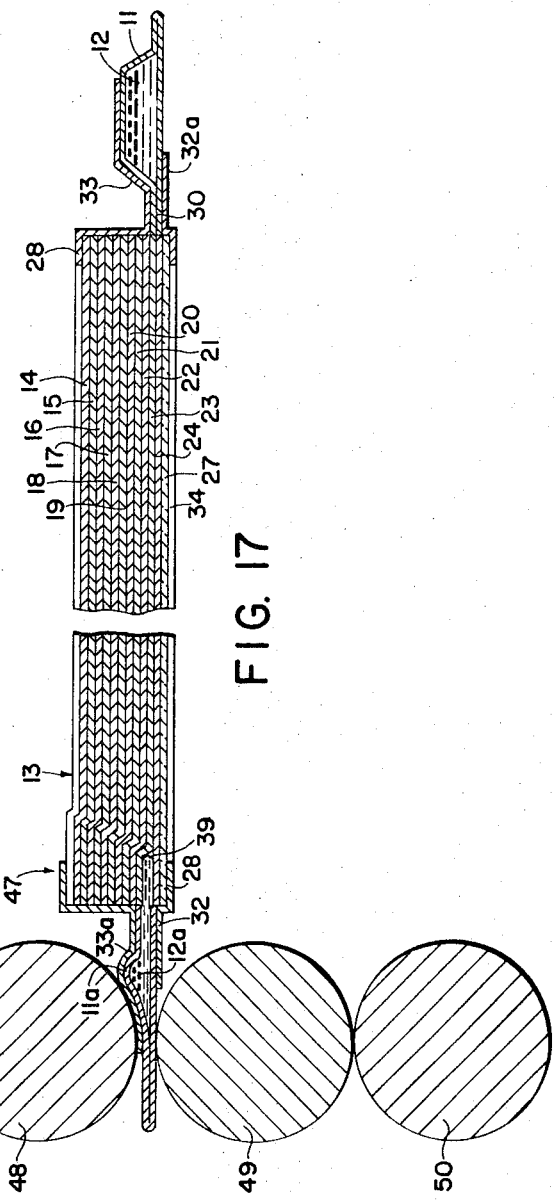

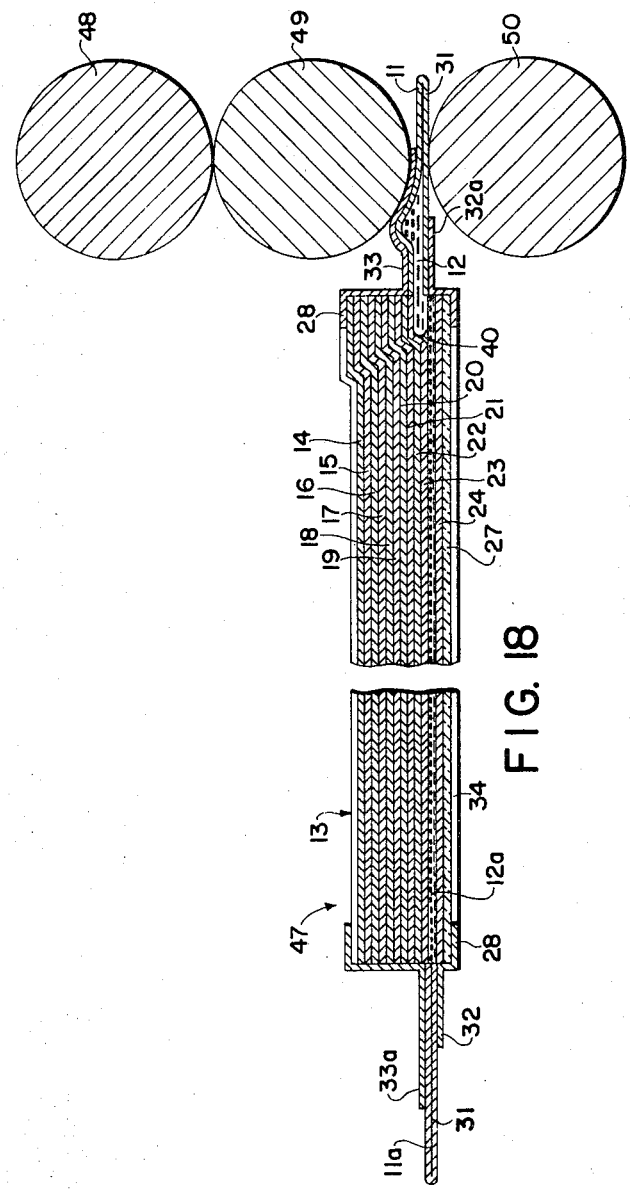

United States Patent Office 3,576,626
Patented Apr. 27, 1971

3,576,626
PHOTOGRAPHIC COLOR DIFFUSION TRANSFER PROCESSES AND FILM UNIT FOR USE THEREIN
Terry W. Milligan, Belmont, and Richard W. Young, Wellesley Hills, Mass., assignors to Polaroid Corporation, Cambridge, Mass.
Filed Oct. 7, 1969, Ser. No. 864,397
Int. Cl. G03c 1/48, 7/00
U.S. Cl. 96—3
54 Claims

ABSTRACT OF THE DISCLOSURE

Simultaneous or sequential application of two processing compositions, one containing an opacifying agent and the other a reflecting material, to an exposed permanently structured film unit to obtain a color diffusion transfer therein.

Figure 6:
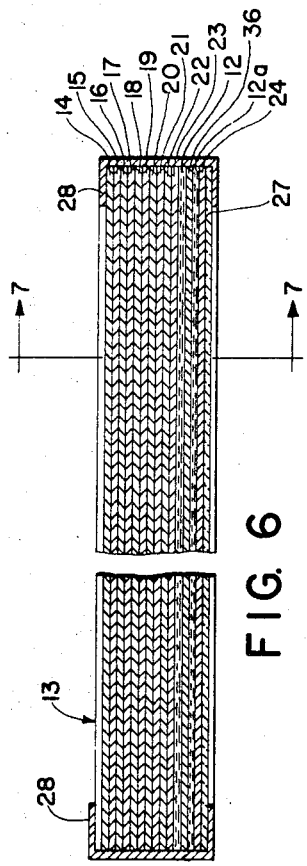

The present invention relates to photography and, more particularly, to photographic products particularly adapted for employment in photographic diffusion transfer color processes.

The primary objects of the present invention are to provide photographic products particularly adapted for employment in diffusion transfer photographic color processes; to provide photographic products which comprise a photosensitive composite structure or laminate which contains a plurality of essential layers including a first dimensionally stable, liquid impermeable layer preferably opaque to actinic radiation, a photosensitive silver halide emulsion layer having a dye image-forming material associated therewith which is soluble and diffusible in processing composition as a function of exposure of the photosensitive silver halide emulsion layer to incident actinic radiation, a permeable polymeric layer dyeable by the dye image-forming material, and a second dimensionally stable, liquid impermeable transparent layer; to provide photographic diffusion transfer products comprising a film unit including a photosensitive laminate, of the last-identified type, in combination with rupturable container means separately retaining a first aqueous processing composition containing dispersed therein an opacifying agent and a second aqueous processing composition containing dispersed therein a reflecting agent, the first and second compositions together possessing a pH and solvent concentration at which the dye image-forming material is soluble and diffusible and the opacifying and reflecting agents together present, upon distribution, in a quantity sufficient to mask the dye image-forming material associated with the photosensitive silver halide emulsion layer and to prevent exposure of the emulsion layer during processing in the presence of radiation actinic thereto and incident on said dimensionally stable transparent layer; to provide a diffusion transfer film unit, of the last-identified type, having the container means fixedly positioned and extending transverse a leading edge of the photosensitive laminate whereby to effect, upon application of compressive pressure, discharge of the first and second processing compositions in order intermediate the opposed surfaces of the photosensitive silver halide emulsion and the dyeable polymeric layer next adjacent thereto; and to provide photographic diffusion transfer color processes employing such products.

Other objects of the invention will in part be obvious and will in part appear hereinafter.

The invention accordingly comprises the product possessing the features, properties and the relation of components and the process involving the several steps and the relation and order of one or more of such steps with respect to each of the other which are exemplified in the following detailed disclosure, and the scope of the application of which will be indicated in the claims.

Figure 7:
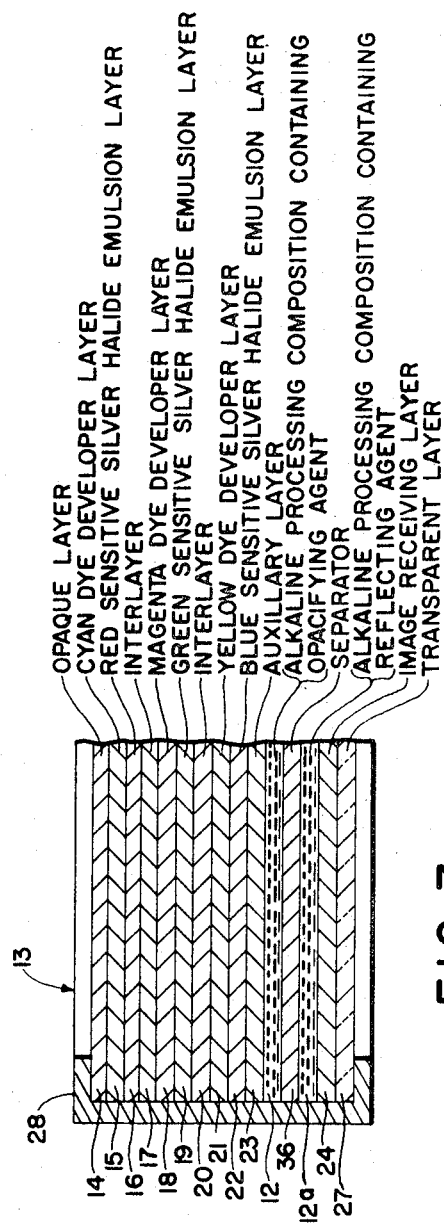

For a fuller understanding of the nature and objects of the invention, reference should be had to the following detailed description taken in connection with the accompanying drawings wherein:

FIG. 1 is a perspective view of a photographic film unit embodying the invention;

FIGS. 2, 4 and 6 are diagrammatic enlarged cross-sectional views of the film unit of FIG. 1, along section line 2—2, illustrating the association of elements during the three illustrated stages of the performance of a diffusion transfer process, for the production of a multicolor transfer image according to the invention, the thickness of the various materials being exaggerated, and wherein FIG. 2 represents an exposure stage, FIG. 4 represents a processing stage and FIG. 6 represents a product of the process;

FIGS. 3, 5 and 7 are diagrammatic, further enlarged cross-sectional view of the film unit of FIGS. 2, 4 and 6, along section lines 3—3, 5—5 and 7—7, respectively, further illustrating, in detail, the arrangement of layers comprising the photosensitive laminate during the three illustrated stages of the transfer process;

FIGS. 8, 9 and 10 are diagrammaic enlarged cross-sectional views of the film unit of FIG. 1, along section line 2—2, illustrating the association of elements during the three illustrated stages of a special embodiment of the performance of a diffusion transfer process, for the production of a multicolor transfer image according to the invention, the thickness of the various materials being exaggerated, and wherein FIG. 8 represents an exposure stage, FIG. 9 represents a first processing stage and FIG. 10 represents a second subsequent processing stage;

FIG. 11 is a perspective view of another modification of a photographic film unit embodying the invention;

FIGS. 12, 13 and 14 are diagrammatic enlarged cross-sectional views of the film unit of FIG. 11, along section line 42—42, illustrating the association of elements during the three illustrated stages of the performance of a diffusion transfer process, for the production of a multicolor transfer image according to the invention, the thickness of the various materials being exaggerated, and wherein FIG. 12 represents an exposure stage, FIG. 13 represents a first processing stage and FIG. 14 represents a second subsequent processing stage;

FIG. 15 is a perspective view of still another modification of a photographic film unit embodying the invention; and FIGS. 16, 17 and 18 are diagrammatic enlarged cross-sectional views of the film unit of FIG. 15, along section line 46—46, illustrating the association of elements during the three illustrated stages of the performance of a diffusion transfer process, for the production of a multicolor transfer image according to the invention, the thickness of the various materials being exaggerated, and wherein FIG. 16 represents an exposure stage, FIG. 17 represents a first processing stage and FIG. 18 represents a second subsequent processing stage.

As disclosed in U.S. Pat. No. 2,983,606, issued May 9, 1961, a photosensitive element containing a dye developer, that is, a dye which is a silver halide developing agent, and a silver halide emulsion may be exposed and wetted by a liquid processing composition, for example, by immersion, coating, spraying, flowing, etc., in the dark, and the exposed photosensitive element is superposed prior to, during, or after wetting, on a sheetlike support element which may be utilized as an image-receiving element. In a preferred embodiment, the liquid processing composition is applied to the photosensitive element in a substantially uniform layer as the photosensitive element is brought into superposed relationship with the image-receiving layer. The liquid processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving element receives a depthwise diffusion, from the developed emulsion, of unoxidized dye developer without appreciably disturbing the imagewise distribution thereof to provide the reversed or positive color image of the developed image. The image-receiving element may contain agents adapted to mordant or otherwise fix the diffused, unoxidized dye developer. If the color of the transferred dye developer is affected by changes in the pH of the image-receiving element, this pH may be adjusted in accordance with well-known techniques to provide a pH affording the desired color. The desired positive image is revealed by stripping the image-receiving layer from the photosensitive element at the end of a suitable imbibition period.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using color image-forming components such as, for example, the previously mentioned dye developers, in diffusion transfer processes by several techniques. One such technique contemplates obtaining multicolor transfer images utilizing dye developers by employment of an integral multilayer photosensitive element, such as is disclosed in the aforementioned U.S. Pat. 2,983,606, and particularly with reference to FIG. 9 of the patent's drawing, wherein at least two selectively sensitized photosensitive strata, superposed on a single support, are processed, simultaneously and without separation, with a single, common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets by suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

The dye developers are preferably selected for their ability to provide colors that are useful in carrying out subtractive color photography, that is, the previously mentioned cyan, magenta and yellow. The dye developers employed may be incorporated in the respective silver halide emulsion, or in the preferred embodiment, in a separate layer behind the respective silver halide emulsion. Specifically, the dye developer may, for example, be in a coating or layer behind the respective silver halide emulsion and such a layer of dye developer may be applied by use of a coating solution containing about 0.5 to 8%, by weight, of the respective dye developer distributed in a film-forming natural, or synthetic, polymer, for example, gelatin, polyvinyl alcohol, and the like, adapted to be permeated by the chosen diffusion transfer fluid processing composition.

As examples of materials, for use as the image-receiving layer, mention may be made of solution dyeable polymers such as nylons as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinylpyridine, as disclosed in U.S. Pat. No. 3,148,061, issued Sept. 8, 1964.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 12, and most preferably includes a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to as alkaline solution such as, for example, a hydroxyethyl cellulose or sodium carboxymethyl cellulose. Additionally, film-forming materials or thickening agents whose ability to increase viscosity is substantially unaffected if left in solution for a long period of time are also disclosed to be capable of utilization. As stated, the film-forming material is preferably contained in the processing composition in such suitable quantities as to impart to the composition a viscosity in excess of 100 cps. at a temperature of approximately 24° C. and preferably in the order of 100,000 cps., to 200,000 cps. at that temperature.

In accordance with aforementioned U.S. Pat. No. 2,983,606, an image-receiving layer of the type disclosed in that patent need not be separated from its superposed contact with the photosensitive element, subsequent to transfer image formation, if the image-receiving element is transparent and a processing composition containing a substance rendering the dried processing composition layer opaque is spread between the image-receiving layer and the silver halide emulsion or emulsions.

However, it has been found, if the image-receiving element is maintained in contact with the photosensitive element, subsequent to dye developer transfer image formation, and includes the presence of an alkaline processing composition, necessarily having a pH at which dye developer, for example, in reduced form, diffuses to form the dye transfer image, intermediate the elements, the transfer image thus formed is unstable over an extended period of time. The dye image instability is due, at least in part, to the presence of what is, in general, a relatively high pH alkaline composition in intimate contact with the dye or dyes forming the image. This contact itself provides instability to the molecular structure of dye by, for example, catalyzing degradation and undesirable structural shifts effecting the spectral absorption characteristics of the image dye. In addition, the presence of an alkaline composition, possessing a pH at which the dye, for example, in reduced form, diffuses also provides an integral dynamic system wherein oxidized dye, immobilized in areas of the photosensitive element, as a function of its development, with the passage of time attempts to generate, in such areas, an equilibrium between oxidized and reduced dye. In that the pH of the dynamic system is such that diffusion of the reduced form of the dye will occur, such reduced dye will, at least in part, transfer to the image-receiving layer and the resultant diffusion will imbalance the equilibrium, in such areas of the photosensitive element, in favor of additional formation of reduced dye. As a function of the efficiency of the image-receiving layer, as a dye sink, such nonimagewise dyeing of the image-carrying layer still further imbalances the equilibrium in favor of the additional formation of dye in reduced, diffusible form. Under such circumstances, the transfer image definition, originally carried by the image-receiving layer, will suffer a continuous decrease in the delta between the image's maximum and minimum densities and may, ultimately, result in the image-receiving element's loss of all semblance of image definition; merely becoming a polymeric stratum carrying a relatively uniform overall dyeing.

Any attempt to decrease the dye sink capacity of the image-carrying layer, for example, by reduction of its mordant capacity, in order to alleviate, at least to an extent, the action of the image-receiving layer as a dye sink, however, will enhance diffusion of the dye, comprising the transfer image, from the image-carrying layer, to the remainder of the element due, at least in part, to the continued presence of the alkaline composition having a pH at which the reduced form of the dye, forming the transfer image, is diffusible. The ultimate result is substantially the same overall image distortion as occurs when the image-receiving layer acts as a dye sink, with the exception that the dye is more extensively distributed throughout the film unit and the ultimate overall dyeing of the image-receiving layer itself is of lower saturation.

The problems inherent in fabricating a film unit of the type wherein the image-receiving element, the alkaline processing composition and the photosensitive element are maintained in contiguous contact subsequent to dye transfer image formation, for example, a film unit of the type described hereinbefore with reference to aforementioned U.S. Pat. No. 2,983,606, may be effectively obviated by fabrication of a film unit in accordance with the physical parameters specifically set forth in U.S. Pats. Nos. 3,415,644; 3,415,645; and 3,415,646.

Specifically, an integral photographic film unit particularly adapted for the production of a dye transfer image of unexpectedly improved stability and other properties, by a color diffusion transfer process will be constructed, for example, in accordance with aforementioned U.S. Pat. No. 3,415,644, to include a photosensitive element comprising a laminate having, in sequence, as essential layers a dimensionally stable opaque layer; a photosensitive silver halide emulsion layer having associated therewith dye image-providing material which is soluble and diffusible, in alkali, at a first pH; an alkaline solution permeable polymeric layer dyeable by the dye-image-providing material; a polymeric acid layer containing sufficient acidifying groups to effect reduction, subsequent to substantial transfer dye image formation, of a selected processing solution having the first pH to a second pH at which said dye image-providing material is insoluble and nondiffusible; and a dimensionally stable transparent layer. In combination with the laminate, a rupturable container retaining an aqueous alkaline processing composition having the first pH and containing an opacifying agent, in a quantity sufficient to mask the dye image-providing material, is fixedly positioned and extends transverse a leading edge of the laminate whereby to effect unidirectional discharge of the container's contents between the alkaline solution permeable and dyeable polymeric layer and the photosensitive silver halide emulsion layer next adjacent thereto, upon application of compressive force to the container.

It will also be recognized that the dimensionally stable polymeric support layer next adjacent the photosensitive silver halide emulsion layer or layers may be transparent, as disclosed in aforementioned U.S. Pat. No. 3,415,646, and that in such instance the opacifying agent may be initially dispersed in the composite film unit intermediate the dyeable polymeric layer and the silver halide emulsion layer next adjacent, as disclosed in aforementioned U.S. Pat. No. 3,415,645.

Employment of the last-mentioned film units, according to the described color diffusion transfer photographic process, specifically provides for the production of a highly stable color transfer image accomplished, at least in part, by effectively obviating the previously discussed disadvantages of the prior art products and processes, by in process adjustment of the environmental pH of the film unit from a pH at which transfer processing is operative to a pH at which dye transfer is inoperative subsequent to substantial transfer image formation. The stable color transfer image is obtained irrespective of the fact that the film unit is maintained as an integral laminate unit during exposure, processing, viewing, and storage of the unit, which transfer image exhibits the required maximum and minimum dye transfer image densities, dye saturation, hues and definition.

However, film units fabricated in accordance with the parameters set forth above specifically require the presence of the stated polymeric acid component to effect in situ process adjustment of the film units' operational pH range.

Specifically, the film units require the presence of a polymeric acid layer such as, for example, of the type set forth in U.S. Pat. No. 3,362,819, which most preferably, includes the presence of an inert timing or spacer layer intermediate the polymeric acid layer carried on a support and the image-receiving layer.

As set forth in the last-mentioned patent, the polymeric acid layer comprises polymers which contain acid groups, such as carboxylic acid and sulfonic acid groups, which are capable of forming salts with alkali metals, such as sodium, potassium, etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid-reacting group is, of course, nondiffusible from the acid polymer layer. In the preferred embodiments disclosed, the acid polymer contains free carboxyl groups and the transfer processing composition employed contains a large concentration of sodium and/or potassium ions. The acid polymers stated to be most useful are characterized by containing free carboxyl groups, being insoluble in water in the free acid form, and by forming water-soluble sodium and/or potassium salts. One may also employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids set forth in the application, mention may be made of dibasic acid half-ester derivatives of cellulose which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives or cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methyl-vinyl ether/maleic anhydride copolymers; etc.

As previously noted, the pH of the processing composition preferably is of the order of at least 12 to 14. The acid polymer layer is disclosed to contain at least sufficient acid groups to effect a reduction in the pH of the image layer from a pH of about 12 to 14 to a pH of at least 11 or lower at the end of the imbibition period, and preferably to a pH of about 5 to 8 within a short time after imbibition, thus requiring, of course, that the action of the polymeric acid be accurately so controlled as not to interfere with either development of the negative or image transfer of unoxidized dye developers. For this reason, the pH of the image layer must be kept at a functional transfer level, for example, 12 to 14 until the dye image has been formed after which the pH is reduced very rapidly to a pH below that at which dye transfer may be accomplished, for example, at least about 11 and preferably about pH 9 to 10. Unoxidized dye developers containing hydroquinonyl developing radicals diffuse from the negative to the positive as the sodium or other alkali salt. The diffusion rate of such dye image-forming components thus is at least partly a function of the alkali concentration, and it is necessary that the pH of the image layer remain on the order of, for example, 12 to 14 until transfer of the necessary quantity of dye has been accomplished. The subsequent pH reduction, in addition to its desirable effect upon image light stability, serves a highly valuable photographic function by substantially terminating further dye transfer.

In order to prevent premature pH reduction during transfer processing, as evidenced, for example, by an undesired reduction in positive image density, the acid groups are disclosed to be so distributed in the acid polymer layer that the rate of their availability to the alkali is controllable, e.g., as a function of the rate of swelling of the polymer layer which rate in turn has a direct relationship to the diffusion rate of the alkali ions. The desired distribution of the acid groups in the acid polymer layer may be effected by mixing the acid polymer with a polymer free of acid groups, or lower in concentration of acid groups, and compatible therewith, or by using only the acid polymer but selecting one having a relatively lower proportion of acid groups. These embodiments are illustrated, respectively, in the cited patent, by (a) a mixture of cellulose acetate and cellulose acetate hydrogen phthalate and (b) a cellulose acetate hydrogen phthalate polymer having a much lower percentage of phthalyl groups than the first-mentioned cellulose acetate hydrogen phthalate.

It is also there disclosed that the layer containing the polymeric acid may contain a water-insoluble polymer, preferably a cellulose ester, which acts to control or modulate the rate at which the alkali salt of the polymer acid is formed. As examples of cellulose esters contemplated for use, mention is made of cellulose acetate, cellulose acetate butyrate, etc. The particular polymers and combinations of polymers employed in any given embodiment are, of course, selected so as to have adequate wet and dry strength and when necessary or desirable, suitable subcoats are employed to help the various polymeric layers adhere to each other during storage and use.

The inert spacer layer of the last-mentioned patent, for example, an inert spacer layer comprising polyvinyl alcohol or gelatin, acts to "time" control the pH reduction by the polymeric acid layer. This timing is disclosed to be a function of the rate at which the alkali diffuses through the inert spacer layer. It is there stated to have been found the pH does not drop until the alkali has passed through the spacer layer, i.e., the pH is not reduced to any significant extent by the mere diffusion into the interlayer, but the pH drops quite rapidly once the alkali diffuses through the spacer layer.

Copending application Ser. No. 782,075, filed Dec. 9, 1968 in the name of Edwin H. Land, discloses an alternative means for effectively obviating the problems inherent in fabricating a film unit of the type where the image-receiving element, the alkali processing composition and the photosensitive element are maintained in contiguous contact during processing and subsequent to dye transfer image formation, for example, a film unit of the type described, with reference to aforementioned U.S. Pat. No. 2,983,606, in a considerably simplified manner by fabrication of a film unit in accordance with the physical parameters detailed below.

Specifically, it is disclosed in Ser. No. 782,075, that an integral photographic film unit of simplified construction and particularly adapted for the production of dye transfer images of improved stability and other desirable properties by a color diffusion transfer process can be constructed to include a photosensitive element comprising a composite structure possessing, in sequence, as essential layers, a first dimensionally stable layer, a photosensitive silver halide emulsion layer having associated therewith a dye image-forming material which is soluble and diffusible at a first processing composition solvent concentration, a polymeric layer dyeable by the dye image-forming material, and a second dimensionally stable layer transparent to incident actinic radiation, wherein the dimensionally stable layers taken together, possess a processing composition solvent vapor permeability sufficient to effect, subsequent to substantial dye transfer image formation and preceding substantial dye transfer image degradation, osmotic transpiration of processing composition solvent in a quantity effective to decrease the first solvent concentration, at which the dye image-forming material is soluble and diffusible, to a second solvent concentration, at which the dye image-forming material is substantially nondiffusible. In combination with the composite structure, a rupturable container retaining a processing composition comprising the solvent is fixedly positioned and extends transverse a leading edge of the composite structure whereby to effect, upon application of compressive pressure, discharge of the processing composition intermediate the dyeable polymeric layer and the photosensitive silver halide emulsion layer next adjacent, in a quantity sufficient to provide the first solvent concentration.

Although in point of fact, the dimensionally stable layers employed in the practice of the invention of the last-mentioned application may employ dimensionally stable layers which possess a vapor transmission rate of 1 or less gms./24 hrs./100 in.$^2$ mil. thickness, in a preferred embodiment, the layers employed possess a vapor transmission rate for the selected processing composition solvent averaging not less than about 100 gms./24 hrs./100 in.$^2$ mil. thickness, most preferably in terms of the preferred solvent, water, a vapor transmission rate averaging in excess of about 300 gms. of water/24 hrs./ 100 in.$^2$ mil. thickness, and may advantageously comprise a microporous polymeric film possessing a pore distribution which does not unduly interfere with the dimensional stability of the layers or, where required, the optical characteristics of such layers. Such pore distribution may comprise, for example, an average pore diameter of from less than about 20 microns to greater than about 100 microns and a pore volume of less than about 3% to greater than about 7%.

The dimensionally stable layers are designed so that there is no liquid flow through the layers while allowing the vapor of the processing composition solvent to pass by diffusion from the evaporating liquid body and the operational efficiency of the film unit is directly dependent upon the nature and quality of the vapor permeable membrane characteristics of the layers selected. The vapor transmission characteristics desired are directed to maximization of the rate at which the required quantity of processing solvent is effectively evacuated from the film unit subsequent to substantial dye transfer image formation by diffusion transfer processing, commensurate with maintaining the liquid impermeability and dimensional stability characteristics of the layers. Thus, the layers should possess the maximum vapor transmission capacity which permits the passage of processing composition solvent vapor, and any gas dissolved therein, at its vapor pressure, without allowing passage of fluid processing composition. The layers employed therefor should be as thin as possible for solvent vapor transmission efficiency yet retain sufficient strength to provide stability to and resist chemical and physical degradation of the film unit under conditions of use.

The dimensionally stable support layers referred to may comprise any of the various types of conventional opaque and transparent rigid or flexible materials possessing the requisite liquid impermeability and vapor transmissivity denoted above, and may comprise polymeric films of both synthetic types and those derived from naturally occurring products. Particularly suitable materials include aqueous alkaline solution impermeable, water vapor permeable, flexible polymeric materials such as vapor permeable polymeric films derived from ethylene glycol terephthalic acid, vinyl chloride polymers; polyvinyl acetate; polyamides; polymethacrylic acid methyl and ethyl esters; cellulose derivatives such as cellulose, acetate, triacetate, nitrate, propionate, butyrate, acetate-propionate, or acetate butyrate; alkaline solution impermeable, water vapor permeable papers; crosslinked polyvinyl alcohol; regenerated cellulose; and the like. Particularly desirable film units may also be advantageously fabricated employing microporous film base materials. For example, film units may be fabricated employing 2 and 4 mil polyethylene terephthalate film base possessing an average pore diameter of about 23 to 107 microns and a pore volume of about 3 to 7%.

Employment of the detailed film unit of the invention of the last-mentioned copending application in color diffusion transfer processes specifically provides for the production of a highly stable transfer image accomplished, at least in part, by in process adjustment of the environmental processing composition solvent concentration from a solvent concentration at which dye diffusion or transfer is operative to a solvent concentration at which dye transfer is inoperative subsequent to substantial transfer image formation.

Copending applications Ser. No. 867,626, filed Oct. 20, 1969, in the name of Terry W. Milligan, and Ser. No. 867,583, filed Oct. 20, 1969, in the name of Sheldon A. Buckler, Terry W. Milligan and Howard G. Rogers, disclose still other means for effectively obviating the problems inherent in fabricating a film unit of the type where the image-receiving element, the alkali processing composition and the photosensitive element are maintained in contiguous contact during processing and subsequent to dye transfer image formation.

Specifically, it is disclosed in Ser. Nos. 867,583 and 867,626 that an integral photographic film unit particularly adapted for the production of dye transfer images of improved stability and other desirable properties by a color diffusion transfer process can be constructed to include a photosensitive element comprising a composite structure possessing, in sequence as essential layers, a first dimensionally stable layer, a photosensitive silver halide emulsion layer having associated therewith a dye image-forming material which is soluble and diffusible as a function of the point-to-point degree of emulsion photoexposure, a polymeric layer dyeable by the dye image-forming material, and a second dimensionally stable layer transparent to incident actinic radiation. In combination with the composite structure, a rupturable container retaining a processing composition is fixedly positioned and extends transverse a leading edge of the composite structure whereby to effect, upon application of compressive pressure, discharge of the processing composition intermediate the dyeable polymeric layer and the photosensitive silver halide emulsion and associated dye image-forming material next adjacent thereto. In addition, the aforementioned integral photographic film unit possesses means for interposing between said dyeable polymeric layer and the photosensitive silver emulsion next adjacent thereto, a continuous dye image-forming material impermeable polymeric layer after substantial image formation has been accomplished in said dyeable polymeric layer in order to obviate further dye migration. Means for the formation of such a continuous polymeric layer include, for example, incorporating in the processing composition a particulate dispersion of a processing composition insoluble polymer as a discontinuous phase, said polymer being adapted, upon decrease in processing composition solvent, to coalesce at ambient temperature. As examples of processing composition insoluble polymers suitable for such an application, mention may be made of the various polymeric solid and liquid materials which provide a latex when dispersed in a solvent in which they are insoluble and stable and, particularly when dispersed in water possessing a preselected pH, known in the art to coalesce at ambient temperatures and at relatively rapid rates upon loss of dispersant solvent to provide relatively impermeable substantially continuous films or polymeric layers including butadiene/styrene copolymers; polyacrylamides; polymethylmethacrylates; polyvinyl chlorides and copolymers thereof; polyvinyl acetates and copolymers thereof; acrylonitrile/ethyl acrylate copolymers; acrylonitrile/styrene/butadiene terpolymers; and the like.

Other techniques for the formation of a continuous dye image-forming material impermeable polymeric stratum, as disclosed in the last-mentioned copending applications, include the coating of a polymeric material intermediate the polymeric dye image-receiving layer and the photosensitive silver halide emulsion layer next adjacent thereto with a polymeric material whose dye image-forming material permeability is a direct function of the pH of the system; i.e., as the pH of the system is increased the permeability of the polymeric layer increases whereby dye image-forming material freely passes therethrouih. However, as the pH of the system is decreased, e.g., by the use of a polymeric acid component of the type set forth in U.S. Pat. No. 3,362,819, the permeability of such a material decreases to an ultimate point at which dye image-forming material is incapable of passing therethrough. Such a system may be visualized as a pH valve. As examples of polymeric materials which may be used to provide a substantially continuous dye image-forming material impermeable stratum between the image-receiving layer and the photosensitive silver halide emulsion layer next adjacent thereto, mention may be made of the various polymeric materials which are known to act as a "pH valve" as aforenoted, such as, for example, polyphenolic polymers such as the acetal of hydroxybenzaldehyde and polyvinyl alcohol; sulfonamides, such as, for example, the acetal of a primary formyl benzene sulfonamide and polyvinyl alcohol; polymers comprising α-trifluoromethylvinyl alcohol segments; the benzene sulfonamide of deacetylated chitin; polyhydroxymethylene; the acetal of 3-hydroxybenzaldehyde and a vinyl alcohol-α-trifluoromethylvinyl alcohol copolymer; novolactic phenol formaldehyde polymers; Santolite MHP (trade name of Monsanto Chemical Company for a formaldehyde benzenesulfonamide condensation polymer); poly-α,α-bis(hydroxyethyl)methylene; etc. Generally speaking, such materials comprise weakly ionized polymeric acids, for example, those having an ionization constant between about $10^{-4}$ and $10^{-12}$.

The above-denoted polymeric compositions whose permeability is directly related to the environmental pH may be utilized by being dissolved in the alkaline processing composition and being spread between the image-receiving layer and the next adjacent photosensitive layer to provide a substantially continuous stratum; or such materials may be coated intermediate the photosensitive silver halide emulsion next adjacent the image-receiving layer, and the image-receiving layer, as a continuous film to be rendered permeable at such time as the processing composition container is ruptured to thereby release the alkaline processing composition whereby the pH valve is rendered permeable to image-producing material until such time as the pH of the system is dropped below a datum level.

In another system which is disclosed in copending application Ser. No. 867,583 referred to supra, the viscosity-increasing ingredients utilized in the processing composition are cross-linked subsequent to substantial image formation in the image-receiving layer to the extent required to provide an image-forming material impermeable layer between the image-receiving layer and the next adjacent silver halide emulsion layer. Such a system may be carried out by incorporating a diffusible cross-linking agent or suitable precursors thereof in the composite photosensitive structure, which, following rupture of the processing composition container, diffuse into distributed processing composition to thereby cross-link a thickening substance or other polymeric material incorporated in said processing composition. As was discussed above, hydroxyethyl cellulose is commonly utilized as a viscosity-increasing agent in conventional diffusion transfer processes, as more fully disclosed and discussed in numerous of the aforementioned patents and particularly in U.S. Pat. No. 2,983,606; suitable cross-linking agents for this and similar materials include divinyl sulfone and precursors thereof, e.g., bis-pyridinium ethyl sulfone chloride, and β-ketoethyl onium salts as disclosed in U.S. Pat. No. 3,345,177.

A still further technique for accomplishing the above-denoted barrier formation as disclosed in copending application Ser. No. 867,583 is to provide a coating intermediate the dye image-forming layer and the photosensitive silver halide emulsion next adjacent thereto wherein a cross-linking agent for the matreial comprising said coating is incorporated in an element of the photographic film unit whereby after substantial image formation in the polymeric dye image-receiving layer sufficient cross-linking agent contacts said coating to render it substantailly impermeable to dye image-forming materials. Thus, for example, a polyvinyl alcohol overcoat may be utilized either over the image-receiving layer or over the next adjacent photosensitive silver halide layer, and a cross-linking agent therefor which will not have a substantial deleterious effect on gelatin may be incorporated within one of the layers comprising the film unit, as, for example, in the denoted interlayer between the red-sensitive silver halide emulsion layer and the magenta dye developer layer. Within such an embodiment, for example, a boric acid cross-linking agent for polyvinyl alcohol may be incorporated in the above-denoted interlayer. Upon rupture of the processing composition container, processing composition is distributed between the image-receiving element and the negative element, rendering the boric acid material diffusible within the system. As this material comes into contact with the polyvinyl alcohol overcoat between the image-receiving layer and the next adjacent photosensitive emulsion layer, the polyvinyl alcohol is cross-linked and becomes impermeable to image-forming materials.

In general, the amount of polymeric materials utilized to form dye image-forming material barriers such as those described in aforementioned copending applications Ser. Nos. 867,626 and 867,583 should be sufficient to provide a continuous layer of about 20 microns in thickness. Upon formation of the ultimate film the substantially continuous layer may contain entrained or entrapped therein one or more of the components, adjuvants or agents originally retained by the processing composition or the like, such as opacifying agent or reflecting agent initially distributed in the processing composition in the film unit embodiments detailed hereinafter. It is also desirable that the substantially continuous polymeric film, in addition to being impermeable to solubilized dye developer, will also be substantially impermeable to solubilized photographic adjuncts present in the film unit in general and more particularly those possessing physical dimensions as, for example, molecular size, less than that of dye developer such as, for example, antifoggants, development restrainers, quaternary accelerators, emulsion stabilizers and sensitizers and the like in order to still further enhance maintenance of dye transfer image stability and acuity.

It has now been found that an improved film unit of the type where the image-receiving element, the alkali processing composition and the photosensitive element are maintained in contiguous contact during processing and subsequent to dye transfer image formation, for example, a film unit of the type described with reference to aforementioned U.S. Pat. No. 2,983,606, may be fabricated in accordance with the physical parameters detailed below.

Specifically, it has been quite unexpectedly discovered that an integral film unit particularly adapted for the production of dye transfer images of unexpectedly improved stability and other desirable properties by a color diffusion transfer process will be constructed to include a photosensitive element comprising a composite structure possessing, in sequence as essential layer, a first dimenionally stable layer, a photosensitive silver halide emulsion layer having associated therewith a dye image-forming material which is soluble and diffusible in processing composition as a function of the point-to-point degree of exposure of the photosensitive silver halide emulsion layer to incident actinic radiation; a permeable polymeric layer dyeable by the dye image-forming material, and a second dimensionally stable layer transparent to incident actinic radiation. In combination with the composite structure, rupturable container means separately retaining a first aqueous processing composition containing an opacifying agent and a second processing composition containing a reflecting agent, which compositions, taken together, possess a pH and solvent concentration at which the dye image-forming material is soluble and diffusible and a concentration of opacifying and reflecting agents in a quantity sufficient, upon distribution, to mask the dye image-providing material associated with the emulsion layer and to prevent exposure of that layer during processing in the presence of actinic radiation incident on the dimensionally stable transparent support layer, is fixedly positioned and extends transverse a leading edge of the laminate, whereby to effect unidirectional discharge of the container's contents, in order layerwise, between the photosensitive silver halide emulsion layer and adjacent alkaline solution permeable and dyeable polymeric layer, upon application of compressive force to the container means.

In one embodiment of the present invention, a processing composition permeable polymeric sheet, transparent in at least those embodiments wherein the first-mentioned dimensionally stable layer is opaque to actinic radiation, is positioned intermediate the dyeable polymeric layer and silver halide emulsion next adjacent, and the container means is specifically adapted to distribute the first processing composition intermediate the silver halide emulsion and polymeric sheet and the second composition intermedite the dyeable polymeric layer and the polymeric sheet. Such construction has been specifically found to obviate, to the maximum extent, incidence of processing composition intermixing, due to turbulence, during substantially simultaneous distribution of the separate processing compositions in contiquous relationship next adjacent each other. This construction facilitates the substantially simultaneous distribution of the respective processing compositions as subtantially separate, individual layers, in the order designated layerwise and specifically required for the practice of the present invention. In addition, it provides maximum flexibility in terms of processing composition selection, and distribution, conditions, in view of the resultant independence of the selected compositions from consideration of the effect of their rheological characteristics upon turbulent intermixing generated in any selected system requiring substantially contemporaneous contiguous distribution.

In an alternate embodiment of the present invention, for example, wherein it is preferred to omit the processing composition permeable polymeric separator sheet, the rupturable container means may be so arranged as to discharge the separate processing compositions sequentially, rather than simultaneously. In such an embodiment, which of the two processing compositions precedes the other is of little consequence. The important effect is that the wavefronts of the respective compositions are maintained separate as they pass between the image-receiving layer and the photosensitive element next adjacent thereto following rupture of their respective compartments. In this way, the areas of maximum turbulence of each of the two compositions are prevented from coinciding, and chances of turbulent intermixing of the two are substantially reduced. Also, as soon as the first of the two processing compositions begins to spread, it begins to lose moisture by diffusion through the various layers, so that chances for intermixing when the second of the two processing compositions is spread are further decreased. This effect may be even further enhanced, if desired, by incorporating a cross-linkable polymer as or in addition to the polymeric binder of the first-spread processing composition, together with means for effecting cross-linking subsequent to the rupture of the first compartment. Thus, for example, if it is desired to rupture initially the compartment containing the processing composition comprising the opacifying agent, followed by rupture of the compartment containing the processing composition comprising the reflecting agent, the former processing composition may comprise a cross-linkable polymer, and a suitable cross-linking agent therefor may be incorporated in or on the surface of the photosensitive element. Conversely, if the compartment containing the processing composition comprising the reflecting agent is to be ruptured initially, and a cross-linkable polymer incorporated therein, the appropriate cross-linking agent may be incorporated in or on the image-receiving sheet. It will be understood that the cross-linkable polymer, and particularly the cross-linking agent, must be so selected as not to have a deleterious effect on the overall photographic process and image formation, and further, that the cross-linked polymer must be processing composition permeable.

In any embodiment of the present invention wherein the processing composition permeable polymeric separator sheet is omitted, and particularly where the respective processing compositions are spread sequentially, it will be apparent that there should be preferably maximum adhesive capacity between the processing composition comprising the opacifying agent and the photosensitive element, and between the processing composition comprising the reflecting agent and the image-receiving element, and preferably little or no adhesive capacity between the processing composition comprising the opacifying agent and the image-receiving element, and between the processing composition comprising the reflecting agent and the photosensitive element.

In a preferred embodiment of the present invention, the film unit is specifically adapted to provide for the production of a multicolor dye transfer image and the photosensitive laminate comprises, in order of essential layers, the dimensionally stable opaque layer; at least two selectively sensitized silver halide emulsion strata each having dye image-providing materials of predetermined color associated therewith which are soluble and diffusible in alkaline processing composition as a function of the point-to-point degree of exposure of the photosensitive silver halide emulsion layer to incident actinic radiation; an alkaline solution permeable polymeric layer dyeable by the dye image-providing materials; and the dimensionally stable transparent layer.

The silver halide emulsions comprising the multicolor photosensitive laminate preferably possess predominant spectral sensitivity to separate regions of the spectrum and each has associated therewith a dye, which is a silver halide developing agent and is, most preferably, substantially soluble in the reduced form only at a selected pH and solvent concentration possessing subsequent to processing a spectral absorption range substantially complementary to the predominant sensitivity range of its associated emulsion.

In view of the fact that the preferred dye image-providing materials comprise dyes which are silver halide developing agents, as stated above, for purposes of simplicity and clarity, the present invention will be further described hereinafter in terms of such dyes, without limitation of the invention to the illustrative dyes denoted, and, in addition, the photographic film unit structure will be detailed hereinafter employing the last-mentioned preferred structural embodiment, without limitation of the invention to the preferred structure denoted.

In the preferred embodiment, each of the emulsion strata, and its associated dye, is separated from the remaining emulsion strata, and their associated dye, by separate alkaline solution permeable polymeric interlayers.

In such preferred embodiment of the invention, the silver halide emulsion comprises photosensitive silver halide dispersed in gelatin and is about 0.6 to 6 microns in thickness; the dye itself is dispersed in an aqueous alkaline solution polymeric binder, preferably gelatin, as a separate layer about 1 to 7 microns in thickness; the alkaline solution permeable polymeric interlayers, preferably gelatin, are about 1 to 5 microns in thickness; the alkaline solution dyeable polymeric layer is transparent and about 0.25 to 0.4 mil in thickness; and each of the dimensionally stable opaque and transparent layers are alkaline solution impermeable, most preferably processing composition vapor permeable and about 2 to 6 mils in thickness. It will be specifically recognized that the relative dimensions recited above may be appropriately modified, in accordance with the desires of the operator, with respect to the specific product to be ultimately prepared.

In the preferred embodiment of the present invention's film unit for the production of a multicolor transfer image, the respective silver halide/dye developer units of the photosensitive element will be in the form of a tripack configuration which will ordinarily comprise a cyan dye developer/red-sensitive emulsion unit contiguous the dimensionally stable opaque layer, the yellow dye developer/blue-sensitive emulsion unit most distant from the opaque layer and the magenta dye developer/green-sensitive emulsion unit intermediate those units, recognizing that the relative order of such units may be varied in accordance with the desires of the operator.

It will also be recognized that the dimensionally stable polymeric support layer next adjacent the photosensitive silver halide emulsion layer or layers may be transparent and in such instances the photosensitive emulsions may be selectively optimized for exposure by actinic radiation incident on the selected transparent polymeric support layer. Such film units, preferably will additionally contain an opaque sheet fixedly positioned, for example, extending transverse a leading edge of the unit, adapted to be superposed on and coextensive with the surface of the transparent support layer opposite the silver halide emulsion layer next adjacent.

The respective layers comprising the composite structure are secured in fixed relationship which, in whole or in part, may be readily and simply achieved by retaining means such as, for example, a pressure-sensitive tape binding member extending around the edges of the composite structure securing or maintaining the layers of the composite together at their respective edges.

Employment of the detailed film unit of the present invention, according to the hereinafter described color diffusion transfer process, specifically provides for the production of a highly stable transfer image irrespective of the fact that the film unit is maintained as an integral laminate unit during exposure, processing, viewing and storage of the unit. Accordingly, by means of the present invention, multicolor transfer images may be provided over an extended processing temperature range which exhibit desired maximum and minimum dye transfer image densities; yellow, magenta and cyan dye saturation; red, green and blue hues; and color separation. These unexpected advantages are in addition to the manufacturing advantages obtained by reason of the present invention's integral color transfer film unit and which will be readily apparent from examination of the unit's parameters, that is, for example, advantages in more efficient utilization of fabricating materials and components, and more simplified and effectively controlled customer utilization of the unit.

Reference is now made to FIGS. 1 through 18 of the drawings wherein there are illustrated preferred film units of the present invention and wherein like numbers, appearing in the various figures, refer to like components.

As illustrated in the drawings, FIG. 1 sets forth a perspective view of one film unit of the present invention, designated 10, each of FIGS. 2 through 7 illustrate diagrammatic cross-sectional views of film unit 10, along the stated section lines 2—2, 3—3, 5—5, and 7—7, during the various depicted stages in the performance of a photographic diffusion transfer process as detailed hereinafter, and FIGS. 8 through 10 illustrate diagrammatic cross-sectional views of film unit 10, along the stated section line 2—2 during the various depicted stages of a special embodiment of the performance of a photographic diffusion transfer process as detailed hereinafter.

Film unit 10 comprises rupturable containers 11 and 11a retaining, prior to processing, aqueous alkaline solutions 12 and 12a, and photosensitive laminate 13 including, in order, dimensionally stable opaque layer 14, preferably an actinic radiation-opaque flexible sheet material; cyan dye developer layer 15; red-sensitive silver halide emulsion layer 16; interlayer 17; magenta dye developer layer 18; green-sensitive silver halide emulsion layer 19; interlayer 20; yellow dye developer layer 21; blue-sensitive silver halide emulsion layer 22; auxiliary layer 23, which may contain an auxiliary silver halide developing agent; image-receiving layer 24; and dimensionally stable transparent layer 27, preferably an actinic radiation transmissive flexible sheet material.

The structural integrity of laminate 13 may be maintained, at least in part, by the adhesive capacity exhibited between the various layers comprising the laminate at their opposed surfaces. However, the adhesive capacity exhibited at an interface intermediate image-receiving layer 24 and the silver halide emulsion layer next adjacent thereto, for example, intermediate image-receiving layer 24 and auxiliary layer 23 as illustrated in FIGS. 2 through 7, should be less than that exhibited at the interface between the opposed surfaces of the remainder of the layers forming the laminate, in order to facilitate distribution of processing solutions 12 and 12a intermediate the stated image-receiving layer 24 and the silver halide emulsion layer next adjacent thereto. The laminate's structural integrity may also be enhanced or provided, in whole or in part, by providing a binding member extending around, for example, the edges of laminate 13, and maintaining the layers comprising the laminate intact, except at the interface between layers 23 and 24 during distribution of alkaline solutions 12 and 12a intermediate those layers. As illustrated in the figures, the binding member may comprise a pressure-sensitive tape 28 securing and/or maintaining the layers of laminate 13 together at its respective edges. Tape 28 will also act to maintain processing solutions 12 and 12a intermediate image-receiving layer 24 and the silver halide emulsion layer next adjacent thereto, upon application of compressive pressure to pods 11 and 11a and distribution of its contents intermediate the stated layers. Under such circumstances, binder tape 28 will act to prevent leakage of fluid processing composition from the film unit's laminate during and subsequent to photographic processing.

Rupturable containers 11 and 11a may be of any suitable configuration adapted to retain and distribute the processing composition and may comprise, for example, the types shown and described in any of U.S. Pats. Nos. 2,543,181; 2,607,685; 2,634,886; 2,653,732; 2,674,532; 2,702,146; 2,723,051; 2,750,075; 2,903,829; 2,992,102; 3,056,491; 3,056,492; 3,152,515; 3,173,580; 3,221,942; and the like. In general, such containers may comprise a rectangular blank of fluid- and air-impervious sheet material folded longitudinally upon itself to form two walls 29 which are sealed to one another along their longitudinal and end margins to form a cavity in which processing solutions 12 and 12a are retained. The longitudinal marginal seals 30 and 30a are made weaker than the end seals 31 so as to become unsealed in response to the hydraulic pressure generated within the fluid contents 12 and 12a of the containers by the application of compressive pressure to walls 29 of the containers.

In particular, fluid containers particularly adapted to retain photographic processing compositions may be formed of a plurality of layers including, respectively, an outer layer, for example, kraft paper; a layer of metallic foil, for example, lead foil; and an inner lining, or layer, of a thermoplastic resin, for example, a polyviny acetal such as polyvinyl butyral, polyvinyl chloride and the like. It will also be recognized that the rupturable container means may comprise a single compartmented rupturable container separately retaining the designated processing solutions such as, for example, compartmented rupturable containers of the type set forth in FIG. 8 of U.S. Pat. No. 2,992,102 or the like. Such compartmented rupturable containers may simply employ a polymeric separator sheet effectively separating a rupturable container's single chamber into two separate container chambers sufficiently insulating the opacifying and reflecting agents from admixture and which sheet may extend intermediate and beyond, if transparent and permeable, longitudinal marginal seal to facilitate simultaneous distribution of each compartment's fluid contents as a functionally separate medium.

As illustrated in FIGS. 1, 2 and 4, containers 11 and 11a are fixedly positioned and extend transverse a leading edge of photosensitive laminate 13 whereby to effect unidirectional discharge of the respective container's contents 12 and 12a, in order, layerwise, between image-receiving layer 24 and the stated layer next adjacent thereto, upon application of compressive force to containers 11 and 11a.

Thus, containers 11 and 11a, as illustrated in FIG. 2, are fixedly positioned and extend transverse a leading edge of laminate 13 with their longitudinal marginal seals 30 and 30a directed towards the interface between image-receiving layer 24 and auxiliary layer 23. As shown in FIGS. 1, 2 and 4, container 11a is fixedly secured to laminate 13 by extension 32 of tape 28, extending over a portion of one wall 29 of container 11a, and to transparent, processing composition and image dye permeable sheet 36 extending intermediate containers 11 and 11a. Container 11 is, in turn, fixedly secured to laminate 13 by a separate retaining member such as illustrated retaining tape 33, extending over a portion of wall 29 of container 11 and a portion of laminate 13's surface generally equal, in area, to about that covered by tape 28, and to sheet 36 extending intermediate containers 11 and 11a. Each of containers 11 and 11a are thus secured to opposite surfaces of sheet 36 interconnecting walls 29a and 29b of containers 11 and 11a.

As illustrated in FIG. 6, extension flap 32 of tape 28 is preferably of such area and dimensions that upon, for example, manual separation of containers 11 and 11a and tape 33, subsequent to distribution of processing compositions 12 and 12a, from the remainder of film unit 10, flap 32 may be folded over the edge of laminate 13, previously covered by tape 33, in order to facilitate maintenance of the laminate's structural integrity, for example, during the flexations inevitable in storage and use of the processed film unit, and to provide a suitable mask or frame, for viewing of the transfer image through the picture viewing area of transparent layer 27.

The fluid contents of the containers, taken together, comprise an aqueous solution having a pH and solvent concentration at which the dye developers are soluble and diffusible and processing composition 12 contains an opacifying and processing solution 12a, a reflecting agent, taken together, in a quantity sufficient to mask the dye developers associated with the silver halide emulsions subsequent to processing to prevent further exposure of the film unit's silver halide emulsion or emulsions, by actinic radiation traversing through the dimensionally stable transparent layer, subsequent to distribution of the processing solution intermediate the dyeable polymeric layer and the stated layer next adjacent thereto. Accordingly, the film unit may be processed, subsequent to distribution of the composition, in the presence of such radiation, in view of the fact that the silver halide emulsion or emulsions or the laminate are appropriately protected by incident radiation, at one major surface by the opaque processing composition and at the remaining major surface by the dimensionally stable opaque layer. If the illustrated binder tapes are also opaque, edge leakage of actinic radiation incident on the emulsion or emulsions will also be prevented. The selected reflecting agent, however, should be one providing a background suitable for viewing the dye developer transfer image formed in the dyeable polymeric layer. In general, while substantially any reflecting agent may be employed, it is preferred that a reflecting agent be selected that will not interfere with the color integrity of the dye transfer image, as viewed by the observer, and, most preferably, an agent which is aesthetically pleasing to the viewer and does not provide a background noise signal degrading, or detracting from, the information content of the image. Particularly desirable reflecting agents will be those providing a white background, for viewing the transfer image, and specifically those conventionally employed to provide background for reflection photographic prints, and especially those agents possessing the optical properties desired for reflection of incident radiation.

As examples of reflecting agents adapted for employment in the practice of the present invention, mention may be made of barium sulfate, zinc oxide, titanium dioxide, barium stearate, silver flake, silicates, alumina, zirconium oxide, zirconium acetyl acetate, sodium zirconium sulfate, kaolin, mica, and the like.

A particularly preferred reflecting agent comprises titanium dioxide due to its highly effective reflection properties. In general, a processing composition containing about 40–50 grams of titanium dioxide dispersed in 100 cc. of water will provide a percent reflectance of incident actinic radiation of about 85–90%, respectively. In the most preferred embodiments, the percent reflectance desired will be in the order of above 85%.

Transparent separator sheet 36 referred to may comprise any of various types of alkaline processing composition permeable rigid or flexible materials including polymeric film or sheet, continuous or mesh, planar or corrugated, of both the synthetic type and those derived from naturally occurring products, including specifically polyamides such as nylon, vinyl polymers, for example, polyvinyl alcohol, partially acetylated polyvinyl alcohol, cellulosic polymers, for example, methyl cellulose, hydroxyethyl cellulose, carboxyethyl cellulose, cellulose sulfate, hydroxypropyl cellulose, and the like, which are generally employed in a thickness of about 0.05 to 1.0 mil.

As examples of opacifying agents adapted for employment in the practice of the present invention, mention may be made of carbon black, iron oxide, titanium (III) oxide, titanium (III) hydroxide, and the like.

Preferred opacifying agent or agents will possess the maximum opacifying capacity per unit weight, be photographically nondeleterious and substantially nondiffusible during and subsequent to distribution of the processing composition containing same. A particularly preferred opacifying agent has been found to comprise carbon black due to its highly efficient absorption characteristics. In general, a processing composition particularly desired for employment in the practice of the present invention will contain carbon black in a concentration effective, e.g., about 3 to 6 grams of carbon black dispersed in 100 cc. of water, to prevent transmission, through the distributed stratum comprising the composition, of in excess of 95% of the actinic radiation incident on the stratum.

In general, preferred agents, both opacifying and reflecting, are those which remain immobile within their respective compositions during and subsequent to photographic processing and particularly those which comprise insoluble and nondiffusible pigment dispersions within their respective processing solutions.

In the performance of a diffusion transfer multicolor process employing film unit 10, the unit is exposed to radiation, actinic to photosensitive laminate 13, incident on the laminate's exposure surface 34, as illustrated in FIG. 2.

Subsequent to exposure, as illustrated by FIGS. 2 and 4, film unit 10 is processed by being passed through opposed suitably gapped rolls 35 in order to apply compressive pressure to frangible containers 11 and 11a and to effect rupture of longitudinal seals 30 and 30a and distribution of alkaline processing compositions 12 and 12a, having a pH at which the cyan, magenta and yellow dye developers are soluble and diffusible, intermediate dyeable polymeric layer 24 and auxiliary layer 23.

Alkaline processing solutions 12 and 12a permeate emulsion layers 16, 19 and 22 to initiate development of the latent images contained in the respective emulsions. The cyan, magenta and yellow dye developers, of layers 15, 18 and 21, are immobilized, as a function of the development of their respective associated silver halide emulsions, preferably substantially as a result of their conversion from the reduced form to their relatively insoluble and nondiffusible oxidized form, thereby providing imagewise distributions of mobile, soluble and diffusible cyan, magenta and yellow dye developer, as a function of the point-to-point degree of their associated emulsion's exposure. At least part of the imagewise distributions of mobile cyan, magenta and yellow dye developer transfers, by diffusion, to aqueous alkaline solution permeable polymeric layer 24 to provide a multicolor dye transfer image to that layer, which is viewable against the background provided by the layer of processing composition 12a comprising a reflecting agent; layer of processing 12 comprising an opacifying agent is also effectively masked by layer of processing composition 12a.

Subsequent to distribution of processing solutions 12 and 12a, containers 11 and 11a may be manually dissociated from the remainder of the film unit, as described above, to provide the product illustrated in FIG. 6.

For the purpose of facilitating initial distribution of processing solutions 12 and 12a as separate layers, respectively, intermediate dyeable polymeric layer 24 and auxiliary layer 23, film unit 10 is illustrated as possessing permeable polymeric sheet 36 intermediate layers 23 and 24. In such embodiment, processing solution 12 is distributed intermediate sheet 36 and auxiliary layer 23, and processing solution 12a is distributed intermediate sheet 36 and dyeable polymeric layer 24. Alternatively, processing compositions may be employed possessing rheological properties adapted to maintain substantial integrity of the separate solutions during and subsequent to distribution within the film unit laminate. Specifically, it is desirable that the opacifying agent or agents employed not substantially diffuse into and contaminate the optical efficiency of the layer comprising the elected reflecting agent.

Where it is desired to distribute processing solutions sequentially rather than simultaneously, various embodiments of the present invention may be employed. Assuming, for example, that it is desired to initiate the distribution of processing composition 12a prior to the distribution of processing composition 12, the embodiment shown in FIGS. 8, 9 and 10 may be employed, wherein longitudinal marginal seal 30a is made weaker than longitudinal marginal seal 30, and the film unit is processed by being passed through two sets of opposed suitably gapped rolls 37 and 38. Rolls 37 are biased such that there is sufficient hydraulic pressure generated within the fluid contents of frangible container 11a to rupture longitudinal marginal seal 30a, but insufficient hydraulic pressure generated within the fluid contents 12 of frangible container 11 to rupture longitudinal marginal seal 30. Thus, as shown in FIG. 9, wave front 39 of processing composition 12a begins to pass intermediate dyeable polymeric layer 24 and auxiliary layer 23 prior to th erupture of container 11. The film unit is then passed through rolls 38, which are biased such that there is sufficient hydraulic pressure generated within the fluid contents 12 of container 11 to rupture longitudinal marginal seal 30, and thus initiate the passing of wave front 40 of processing composition 12 intermediate auxiliary layer 23 and fluid layer 12a. It will be understood that the adhesive capacity between processing composition 12 and auxiliary layer 23 should exceed any affinity of processing composition 12a toward auxiliary layer 23; preferably, there is maximum adhesive capacity between processing composition 12 and auxiliary layer 23, and between processing composition 12a and dyeable polymeric layer 24, and little or no adhesive capacity between processing composition 12 and dyeable polymeric layer 24 or between processing composition 12a and auxiliary layer 23. FIG. 10 illustrates the processing stage wherein both of containers 11a and 11 have been ruptured, and processing compositions 12a and 12 are being spread layerwise intermediate dyeable polymeric layer 24 and auxiliary layer 23, the respective wave fronts 39 and 40 being maintained separate.

In the embodiment just described, it will be understood that owing to the sequential rupture of containers 11 and 11a, transparent sheet 36 of film unit 10 may be omitted. Where this is the case, interconnecting walls 29a and 29b of containers 11 and 11a may, if desired, be affixed to each other via an adhesive bond, as shown in FIGS. 8, 9 and 10, containers 11 and 11a are fixedly secured to laminate 13 and to each other by extension 32 of tape 28, and a separate retaining member such as illustrated retaining tape 33.

FIG. 11 sets forth a perspective view of a different embodiment of the film unit of the present invention, designated 41, and FIGS. 12, 13 and 14 each illustrate diagrammatic cross-sectional views of film unit 41 along the stated section line 42—42, during the performance of a photographic diffusion transfer process wherein alternate means is provided for the sequential distribution of processing composition.

Film unit 41 comprises a pair of adjacent rupturable containers 11 and 11a retaining, prior to processing, aqueous alkaline solutions 12 and 12a, and photosensitive laminate 13. Container 11a, when deformed by opposed compressional forces, is capable of releasing its contents 12a through rupturable longitudinal marginal seal 30a for spreading between auxiliary layer 23 and image-receiving layer 24. Similarly, container 11, when deformed by opposed compressional forces, is capable of releasing its contents 12 through rupturable longitudinal marginal seal 30 for spreading between auxiliary layer 23 and image-receiving layer 24. It is to be noted that in the embodiment shown, container 11 is shorter in length than container 11a, and that an extension 30b of longitudinal marginal seal 30 of container 11 overlaps an edge of container 11a. By virtue of this construction, container 11 is capable of discharging its contents 12 following rupture of extension 30b of longitudinal marginal seal 30 evenly and without obstruction in a layer intermediate auxiliary layer 23 and the layer of processing composition 12a which is spread following rupture of container 11a.

As illustrated in FIGS. 11 through 14, a container 11a is fixedly positioned and extends transverse a leading edge of photosensitive laminate 13, and container 11 is fixedly positioned and extends transverse an edge of wall 29 of container 11a, whereby to effect unidirectional discharge of the respective containers' contents 12a and 12, in order, layerwise, between auxiliary layer 23 and image-receiving layer 24, upon sequential application of compressive force to containers 11a and 11. Container 11a is fixedly secured to laminate 13, and container 11, to container 11a, by extension 32 of tape 28, extending over a portion of one wall 29 of container 11a, to a portion of one wall 29 of container 11, and by a separate retaining member such as illustrated retaining tape 33, extending over a portion of wall 29 of container 11a and a portion of wall 29 of container 11, and over a portion of laminate 13's surface generally equal, in area, to about that covered by tape 28. Preferably, containers 11 and 11a are further secured to each other, for example, by an adhesive bond between the respective container walls at the overlapping portions thereof.

Means are provided for enabling the sequential application of opposed compressional forces to containers 11 and 11a and the sequential spreading of their contents in order, layerwise, between auxiliary layer 23 and image-receiving layer 24. In the form shown, this means includes a pair of crush-resistant, relatively incompressible elements 43, secured to extensions 51 of wall 29 of container 11 at the portions of container 11 corresponding to the end marginal seals thereof.

The sequential application of opposed compressional forces to containers 11 and 11a, together with sequential spreading of their respective contents 12 and 12a may be accomplished by unidirectional movement of the assemblage with respect to such pressure-applying means as two suitably gapped pairs of rolls 44 and 45. Rolls 44 are provided with comparatively long, cylindrical, pressure-applying surfaces, rolls 45 with comparatively short ones. Elements 43 are spaced from each other by a distance less than the length of the pressure-applying surfaces of rolls 44 and greater than the length of the pressure-applying surfaces of rolls 45. Thus, as the assemblage advances unidirectionally between rolls 44 and 45, elements 43 prevent rolls 44 from compressing container 11, permit rolls 44 to compress container 11a, and permit rolls 45 to compress container 11.

Crush-resistant elements 43 are composed of any suitable material having a high Young's modulus, such as stiff cardboard or synthetic resin, the elements being at least substantially as great in height as the thickness of the processing composition-carrying portion of container 11.

In the performance of a diffusion transfer multicolor process employing film unit 41, the unit is exposed as described in previous embodiments. Subsequent to exposure, as illustrated by FIGS. 12 through 14, film unit 41 is processed by being passed through opposed suitably gapped rolls 44 and 45. FIG. 13 is illustrative of the processing stage wherein rolls 44, having passed over container 11 and lifts 43, are in the process of rupturing container 11a, resulting in the spreading of wave front 39 of processing composition 12a between auxiliary layer 23 and image-receiving layer 24. FIG. 14 is illustrative of a subsequent processing stage wherein rolls 45 have passed between lifts 43 thereby rupturing container 11a and spreading processing composition 12, beginning with wave front 40 thereof, intermediate auxiliary layer 23 and the first-spread layer of processing composition 12a. It will be appreciated that the respective processing compositions employed in such an embodiment possess rheological properties adapted to maintain substantial integrity of the separate solutions during and subsequent to distribution within the film unit laminate, and preferably, that the relative adhesive capacities of the two processing composition layers, image-receiving layer 24 and auxiliary layer 23, be such that the likelihood of contamination between the two processing composition layers is even further reduced, as described previously.

Subsequent to distribution of processing solutions 12 and 12a, latent image development in the respective emulsion layers and image formation in image-receiving layer 24 take place as described above. Containers 11 and 11a may be manually dissociated from the remainder of the film unit to provide the product essentially as shown in FIG. 6, with the exception that polymeric sheet 36 may be omitted.

FIG. 15 sets forth a perspective view of still another embodiment of the film unit of the present invention, designated 47, and FIGS. 16, 17 and 18 each illustrate diagrammatic cross-sectional views of film unit 47 along the stated section line 46—46, during the performance of a photographic diffusion transfer process wherein a different means is provided for the sequential distribution of processing composition.

Film unit 47 comprises a pair of rupturable containers 11 and 11a retaining, prior to processing, aqueous alkaline solutions 12 and 12a, and photosensitive laminate 13. As illustrated in FIGS. 15 through 18, container 11 is fixedly positioned and extends transverse one edge of photosensitive laminate 13 with its longitudinal marginal seal 30 directed toward the interface between image-receiving layer 24 and auxiliary layer 23, whereby to effect unidirectional discharge of its contents 12 between image-receiving layer 24 and auxiliary layer 23, upon application of compressive force to container 11. Container 11 is fixedly secured to laminate 13 by extension 32 of tape 28, extending over a portion of one wall 29 of container 11, and by a separate retaining member such as illustrated tape 33, extending over a portion of wall 29 of container 11, and a portion of laminate 13's surface generally equal, in area, to about that covered by tape 28. Container 11a is fixedly positioned and extends transverse the edge of photosensitive laminate 13 opposite that to which container 11 is attached. Longitudinal marginal seal 30a is directed toward the interface between image-receiving layer 24 and auxiliary layer 23, whereby to effect unidirectional discharge of its contents 12a between image-receiving layer 24 and auxiliary layer 23, upon application of compressive force to container 11a. Container 11a is fixedly secured to laminate 13 by extension 32a of tape 28, extending over a portion of one wall 29 of container 11a, and by a separate retaining member such as illustrated tape 33a, extending over a portion of wall 29 of container 11a, and a portion of laminate 13's surface generally equal, in area, to about that covered by tape 28. Both of extension flaps 32 and 32a of tape 28 are preferably of such area and dimensions that upon, for example, manual separation of containers 11 and 11a and tapes 33 and 33a, subsequent to distribution of processing compositions 12 and 12a, from the remainder of film unit 47, flaps 32 and 32a may be folded over the edges of laminate 13, previously covered by tapes 33 and 33a, respectively, in order to facilitate maintenance of the laminate's structural integrity.

The sequential application of opposed compressional forces to containers 11 and 11a, together with sequential spreading of their respective contents 12 and 12a, may be accomplished, subsequent to exposure of the photosensitive unit as described previously, by the sequence of steps as detailed in FIGS. 16, 17 and 18. FIGS. 16 and 17 are illustrative of a first processing stage, wherein film unit 47 is passed between opposed suitably gapped rolls 48–49, thereby rupturing container 11a, resulting in the spreading of processing composition 12a between auxiliary layer 23 and image-receiving layer 24. The bias exerted on gapped rolls 48–49 is such that while there is sufficient hydraulic pressure generated within fluid contents 12a to rupture container 11a, there is not sufficient hydraulic pressure generated within fluid contents 12 to rupture end seal 31 of container 11. Owing to the direction of movement of film unit 47 between rolls 48–49, longitudinal marginal seal 30 of container 11 is not ruptured at this stage. If desired, seal 30 may be made stronger than longitudinal marginal seal 30a of container 11a, thereby further reducing any possibility of premature rupture of container 11. Subsequent to the complete passage of film unit 47 between rolls 48–49 and the completion of the passage of wave front 39 of processing composition 12a intermediate auxiliary layer 23 and image-receiving layer 24 forming thereby a layer of processing composition 12a, the direction of motion of film unit 47 is reversed, to provide for a second processing stage wherein container 11 is ruptured. As shown in FIG. 18, rupture of container 11 is achieved by passing film unit 47 through opposed, suitably gapped rolls 49 and 50. It will be understood that where there is no significant difference in the strength of longitudinal end seals 30a and 30 of containers 11a and 11, container 11 may be ruptured by simply passing film unit 47 back through rolls 48–49. However, particularly where longitudinal end seal 30 of container 11 is stronger, it is preferred that a second set of rolls be employed, which are so biased as to generate greater hydraulic pressure within the fluid contents 12 of container 11 than the hydraulic pressure generated within the fluid contents 12a of container 11a at the time of rupture thereof. The second set of rolls may be separate and distinct from the first, or as shown in FIGS. 16, 17 and 18, may comprise one freely-rotatable roll 49 of the first pair of rolls 48–49, acting in conjunction with a third roll 50. Following rupture of container 11 as illustrated in FIG. 18, processing composition 12 is spread intermediate auxiliary layer 23 and layer of processing composition 12a. It will be appreciated that in the embodiment just described, it is necessary that the rheological properties of the respective processing compositions and the relative adhesive capacities of the respective processing composition layers, image-receiving layer 24 and auxiliary layer 23 be such that upon rupture of container 11, wave front 40 of processing composition 12 spreads intermediate processing composition layer 12a and auxiliary layer 23.

Subsequent to distribution of processing solutions 12 and 12a, latent image development and image formation take place as previously described. Containers 11 and 11a each may be manually dissociated from the remainder of the film unit, and flaps 32 and 32a each may be folded over their respective edges of laminate 13 previously covered by tapes 33 and 33a.

The present invention will be further illustrated and detailed in conjunction with the following illustrative constructions which set out representative embodiments and photographic utilization of the novel photographic film units of this invention, which, however, are not limited to the details therein set forth and are intended to be illustrative only.

Film units similar to that shown in the drawing may be prepared, for example, by coating, in succession, on a gelatin subbed, 5 mil. opaque cellulose triacetate film base, the following layers:

(1) A layer of the cyan dye developer 1,4-bis-($\beta$-[hydroquinonyl - $\alpha$ - methyl] - ethylamino)-5,8-dihydroxy-anthraquinone dispersed in gelatin and coated at a coverage of about 150 mgs./ft.$^2$ of dye and about 200 mgs./ft.$^2$ of gelatin;

(2) A red-sensitive gelatino-silver iodobromide emulsion coated at a coverage of about 200 mgs./ft.$^2$ of silver about 100 mgs./ft.$^2$ of gelatin;

(3) A layer of gelatin coated at a coverage of about 200 mgs./ft.$^2$;

(4) A layer of the magenta dye developer 2-(p-[β-hydroquinonylethyl] - phenylazo) - 4-isopropoxy-1-naphthol dispersed in gelatin and coated at a coverage of 70 mgs./ft.$^2$ of dye and about 100 mgs./ft.$^2$ of gelatin;

(5) A green-sensitive gelatino-silver iodobromide emulsion coated at a coverage of about 100 mgs./ft.$^2$ of silver and 60 mgs./ft.$^2$ of gelatin;

(6) A layer containing 4'-methylphenyl hydroquinone dispersed in gelatin and coated at coverage of about 25 mgs./ft.$^2$ of 4'-methylphenyl hydroquinone and about 150 mgs./ft.$^2$ of gelatin;

(7) A layer of the yellow dye developer 4-(p-[β-hydroquinonylethyl] - phenylazo) - 3-(N-n-hexylcarbamido)-1-phenyl-5-pyrazolone dispersed in gelatin and coated at a coverage of about 40 mgs./ft.$^2$ of dye and 50 mgs./ft.$^2$ of gelatin;

(8) A blue-sensitive gelatino-silver iodobromide emulsion coated at a coverage of about 60 mgs./ft.$^2$ of silver and about 50 mgs./ft.$^2$ of gelatin; and (9) A layer of gelatin coated at a coverage of about 30 mgs./ft.$^2$ of gelatin.

Then a transparent 5 mil. cellulose triacetate film base may be coated with a 2:1 mixture, by weight, of polyvinyl alcohol and poly-4-vinylpyridine, at a coverage of approximately 600 mgs./ft.$^2$, to provide a polymeric image-receiving layer approximately 0.40 mil. thick.

The two components thus prepared may then be taped together in laminate form at their respective edges, with an intermediate sheet of methyl cellulose 0.05 to 1.0 mil. thick, by means of a pressure-sensitive binding tape extending around, in contact with, and over the edges of the resultant laminate.

Two separate rupturable containers comprising an outer layer of paper, an intermediate layer of lead foil and an inner liner or layer of polyvinyl chloride and retaining, respectively, an aqueous alkaline processing composition comprising:

Water—100 cc.
Potassium hydroxide—11.2 grams
Hydroxyethyl cellulose (high viscosity) [commercially available from Hercules Powder Co., Wilmington, Del., under the trade name Natrasol 250]—3.4 grams
N-benzyl-α-picolinium bromide—1.5 grams
Benzotriazole—1 gram
Carbon black—6 grams and Water—100 cc.
Potassium hydroxide—11.2 grams
Hydroxyethyl cellulose (high viscosity) [commercially available from Hercules Powder Co., Wilmington, Del., under the trade name Natrasol 250]—3.4 grams
N-benzyl-α-picolinium bromide—1.5 grams
Benzotriazole—1 gram
Titanium dioxide—50 grams may then be fixedly mounted on the leading edge, of each of the laminates, by pressure-sensitive tapes interconnecting the respective containers and laminates, such that upon application of compressive pressure to the containers their contents would be distributed, upon rupture of the respective container's marginal seal, in order, between auxiliary layer 23 (layer number 9 in the illustrative construction above) and the polymeric image-receiving layer, the first solution denoted distributed between auxiliary layer 23 and the methyl cellulose sheet and the second solution denoted distributed between the image-receiving layer and the methyl cellulose sheet.

The photosensitive laminates may then be exposed through step wedges to selectively filtered radiation incident on the transparent cellulose triacetate layer and processed, in the presence of actinic radiation, subsequent to passage of the exposed film unit through suitable gapped opposed rolls, to effect rupture of the containers and distribution of their contents. During processing, the multicolor dye transfer image formation may be viewed through the transparent cellulose triacetate film base and such image formation is found to be substantially completed and exhibiting the required color brilliance, hues, saturation, and isolation, within a period of approximately 1–2 minutes.

The pH and solvent concentration of the alkaline processing solution, taken together, initially employed must be an alkaline pH at which the dye developers employed are soluble and diffusible. Although it has been found that the specific pH to be employed may be readily determined empirically for any dye developer, or group of dye developers, most particularly desirable dye developers are soluble at pH's above 9 and relatively insoluble at pH's below 9, in reduced form, and relatively insoluble at substantially any alkaline pH, in oxidized form, and the system can be readily balanced accordingly for such dye developers. In addition, although as previously noted, the processing composition, in the preferred embodiment, will include the stated film-forming viscosity-increasing agent, or agents, to facilitate spreading of the composition and to provide maintenance of the spread composition as a structurally stable layer of the laminate, subsequent to distribution, it is not necessary that such agent be employed as a component of the composition.

Where desired, a polymeric acid layer, for example, of the type discussed above, may be additionally incorporated, as stated, in the film unit of the present invention, to provide reduction of the alkalinity of the processing solution from a pH at which the dyes are soluble to a pH at which the dyes are substantially nondiffusible, in order to advantageously further stabilize the dye transfer image. In such instance, the polymeric acid layer may be positioned intermediate the transparent support and image-receiving layer, and/or the opaque support and next adjacent emulsion/dye unit layer, and the film unit may also contain a polymeric spacer or barrier layer next adjacent the polymeric acid layer, opposite the respective support layer, as previously described.

Also, where desired, means may be provided in the film unit of the present invention for interposing a continuous dye developer-impermeable polymeric layer between the image-receiving layer and the next adjacent emulsion/dye unit layer after substantial image formation has been accomplished in the image-receiving layer, as described above. Components for such a barrier layer may be provided, if desired, in either of the rupturable processing composition containers. Where the barrier layer comprises a preformed layer as heretofore described, such a layer may be coated, for example, on the image-receiving layer or on or as the auxiliary layer; where a separator sheet is included between the respective containers as described above, such a sheet may comprise the barrier layer.

Further, the dimensionally stable, liquid impermeable layers may be selected as previously described so that taken together they posses a processing composition vapor permeability sufficient to effect, subsequent to substantial dye transfer image formation, osmotic transpiration of processing composition solvent to an extent such that the solubility and/or diffusibility of the dye developers are at least substantially diminished, and preferably terminated altogether.

It will thus be appreciated that there are numerous ways available to one skilled in the art for overcoming the problems discussed hereinbefore with reference to aforementioned U.S. Pat. No. 2,983,606. Any of the foregoing mechanisms, for example, taken individually or in combination, may be effectively employed to terminate dye transfer subsequent to image formation in the film unit of the present invention, resulting in a photographic image of high stability and permanence.

It will be noted that the liquid processing composition employed may contain an auxiliary or accelerating developing agent, such as p-methylaminophenol, 2,4-diaminophenol, p-benzylaminophenyl, hydroquinone, toluhydroquinone, phenylhydroquinone, 4'-methylphenylhydorquinone, etc. It is also contemplated to employ a plurality of auxiliary or accelerating developing agents, such as 3-pyrazolidone developing agent and a benzenoid developing agent, as disclosed in U.S. Pat. No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bis-ethylenimino-hydroquinone. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It may be noted that at least a portion of the dye developer oxidized during development may be oxidized and immobilized as a result of a reaction, e.g., an energy-transfer reaction, with the oxidation product of an oxidized auxiliary developing agent, the latter developing agent being oxidized by the development of exposed silver halide. Such a reaction of oxidized developing agent with unoxidized dye developer would regenerate the auxiliary developing agent for further reaction with the exposed silver halide.

In addition, development may be effected in the presence of an onium compound, particularly a quaternary ammonium compound, in accordance with the processes disclosed in U.S. Pat. No. 3,173,786, issued Mar. 16, 1965.

It will be apparent that the relative proportions of the agents of the diffusion transfer processing composition may be altered to suit the requirements of the operator. Thus, it is within the scope of this invention to modify the herein described developing compositions by the substitution of preservatives, alkalies, etc., other than those specifically mentioned, provided that the pH of the composition is initially at the first pH and solvent concentration required. When desirable, it is also contemplated to include, in the developing composition, components such as restrainers, accelerators, etc. Similarly, the concentration of various components may be varied over a wide range and when desirable adaptable components may be disposed in the photosensitive element, prior to exposure, in a separate permeable layer of the photosensitive element and/or in the photosensitive emulsion.

In all examples of this specification, percentages of components are given by weight unless otherwise indicated.

An extensive compilation of specific dye developers particularly adapted for employment in photographic diffusion transfer processes is set forth in aforementioned U.S. Pat. No. 2,983,606, and in the various copending U.S. applications referred to in that patent, especially in the table of U.S. applications incorporated by reference into the patent as detailed in column 27. As examples of additional U.S. patents detailing specific dye developers for photographic transfer process use, mention may also be made of U.S. Pats. Nos. 2,983,605; 2,992,106; 3,047,386; 3,076,808; 3,076,820; 3,077,402; 3,126,280; 3,131,061; 3,134,762; 3,134,765; 3,135,604; 3,135,605; 3,135,606; 3,135,734; 3,141,772; 3,142,565; and the like.

As additional examples of synthetic, film-forming, permeable polymers particularly adapted to retain dispersed dye developer, mention may be made of nitrocarboxymethyl cellulose, as disclosed in U.S. Pat. No. 2,992,104; an acylamidobenzene sulfo ester of a partial sulfobenzal of polyvinyl alcohol, as disclosed in U.S. Pat. No. 3,043,692; polymers of N-alkyl-$\alpha,\beta$-unsaturated carboxamides and copolymers of N-alkyl-$\alpha$-$\beta$-carboxamides with N-hydroxyalkyl-$\alpha,\beta$-unsaturated carboxamides, as disclosed in U.S. Pat. No. 3,069,263; copolymers of vinylphthalimide and $\alpha,\beta$-unsaturated carboxylic acids, as disclosed in U.S. Pat. No. 3,061,428; copolymers of N-vinylpyrrolidones and $\alpha,\beta$-unsaturated carboxylic acids and terepolymers of N-vinylpyrrolidones, $\alpha,\beta$-unsaturated carboxylic acids and alkyl esters of $\alpha,\beta$-unsaturated carboxylic acids, as disclosed in U.S. Pat. No. 3,044,873; copolymers of N,N-dialkyl-$\alpha,\beta$-unsaturated carboxamides with $\alpha,\beta$-unsaturated carboxylic acids, the corresponding amides of such acids, and copolymers of N-aryl-and N-cycloalkyl-$\alpha,\beta$-unsaturated carboxamides with $\alpha,\beta$-unsaturated carboxylic acids, as disclosed in U.S. Pat. No. 3,069,264; and the like.

In addition to conventional techniques for the direct dispersion of a particulate solid material in a polymeric, or colloidal, matrix such as ball-milling and the like techniques, the preparation of the dye developer dispersion may also be obtained by dissolving the dye in an appropriate solvent, or mixture of solvents, and the resultant solution distributed in the polymeric binder, with optional subsequent removal of the solvent, or solvents, employed, as, for example, by vaporization where the selected solvent, or solvents, possesses a sufficiently low boiling point or washing where the selected solvent, or solvents, possesses a sufficiently high differential solubility in the wash medium, for example, water, when measured against the solubility of the remaining composition components, and/or obtained by dissolving both the polymeric binder and dye in a common solvent.

For further detailed treatment of solvent distribution systems of the types referred to above, and for an extensive compilation of the conventional solvents traditionally employed in the art to effect distribution of photographic film units, reference may be made to U.S. Pats. Nos. 2,269,158; 2,322,027; 2,304,939; 2,304,940; 2,801,171; and the like.

Although the invention has been discussed in detail throughout employing dye developers, the preferred dye image-providing materials, it will be readily recognized that other, less preferred, dye image-providing materials may be substituted in replacement of the preferred dye developers in the practice of the invention. For example, there may be employed dye image-forming materials such as those disclosed in U.S. Pats. Nos. 2,647,049, issued July 28, 1953; 2,661,283, issued Dec. 1, 1953; 2,698,244, issued Dec. 28, 1954; 2,698,798, issued Jan. 4, 1955; and 2,802,735, issued Aug. 13, 1957, wherein color diffusion transfer processes are described which employ color coupling techniques comprising, at least in part, reacting one or more color developing agents and one or more color formers or couplers to provide a dye transfer image to a superimposed image-receiving layer and those disclosed in U.S. Pat. No. 2,774,668, issued Dec. 18, 1956, wherein color diffusion transfer processes are described which employ the imagewise differential transfer of complete dyes by the mechanisms therein described to provide a transfer dye image to a contiguous image-receiving layer.

For the production of the photosensitive gelatino silver halide emulsions employed to provide the film unit, the silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various flocc systems, or procedures, adapted to effect removal of undesired components, for example, the procedures described in U.S. Pats. Nos. 2,614,928; 2,614,929; 2,728,662; and the like; after-ripening the dispersion at an elevated temperature in combination with the addition of gelatin and various adjuncts, for example, chemical sensitizing agents of U.S. Pats. Nos. 1,574,944; 1,623,499; 2,410,689; 2,597,856; 2,597,915; 2,487,850; 2,518,-

698; 2,521,926 and the like; all according to the traditional procedures of the art, as described in Neblette, C. B., Photography Its Materials and Processes, 6th ed., 1962.

Optical sensitization of the emulsion's silver halide crystals may be accomplished by contact of the emulsion composition with an effective concentration of the selected optical sensitizing dyes dissolved in an appropriate dispersing solvent such as methanol, ethanol, acetone, water, and the like all according to the traditional procedures of the art, as described in Hammer, F. M., The Cyanine Dyes and Related Compounds.

Additional optical additives, such as coating aids, hardeners, viscosity-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will, as previously described, preferably comprise a crystal of silver, for example, one or more of the silver halides such as silver chloride, silver iodide, silver bromide, or mixed silver halides such as silver chlorobromide or silver iodobromide, of varying halide ratios and varying silver concentrations.

The emulsions may include the various adjuncts, or addenda, according to the techniques disclosed in the art, such as speed-increasing compounds of the quaternary ammonium type, as described in U.S. Pats. Nos. 2,271,623; 2,288,226 and 2,334,864 or of the polyethyleneglycol type, as described in U.S. Pat. No. 2,708,162; or of the preceding combination, as described in U.S. Pat. No. 2,886,437; or the thiopolymers, as described in U.S. Pats. Nos. 3,046,129 and 3,046,134.

The emulsions may also be stabilized with the salts of the noble metals such as ruthenium, rhodium, palladium, iridium and platinum, as described in U.S. Pats. Nos. 2,566,245 and 2,566,263; the mercury compounds of U.S. Pats. Nos. 2,728,663; 2,728,664 and 2,728,655; the triazoles of U.S. Pat. No. 2,444,608; the azindines of U.S. Pats. Nos. 2,444,605; 2,444,606; 2,444,607; 2,450,397; 2,444,609; 2,713,541; 2,743,181; 2,716,062; 2,735,769; 2,756,147; 2,772,164 and those disclosed by Burr in "Zwiss. Pot.," volume 47, 1952, pages 2–28; the disulfides of Belgain Pat. No. 569,317; the benzothiazolium compounds of U.S. Pats. Nos. 2,131,038 and 2,694,716; the zinc and cadmium salts of U.S. Pat. No. 2,839,405; and the mercapto compounds of U.S. Pat. No. 2,819,965.

Hardening agents such as inorganic agents providing polyvalent metallic atoms, specifically polyvalent aluminum or chromium ions, for example, potash alum $[K_2Al_2(SO_4)_4 \cdot 24H_2O]$ and chrome alum $$[K_2Cr_2(SO_4)_4 \cdot 24H_2O]$$

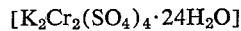

and inorganic agents of the aldehyde type, such as formaldehyde, glyoxal, mucochloric, etc.; the ketone type such as diacetyl; the quinone type; and the specific agents described in U.S. Pats. Nos. 2,080,019; 2,725,294; 2,725,295; 2,725,305; 2,726,162; 2,732,316; 2,950,197; and 2,870,013, may be incorporated, where desired and compatible, in the selected coating solution compositions.

Coating solution compositions employed to fabricate the respective strata of the film unit may contain one or more coating aids, where desired and compatible, such as saponin; a polyethyleneglycol of U.S. Pat. No. 2,831,766; a polyethyleneglycol ether of U.S. Pat. No. 2,719,087, a taurine of U.S. Pat. No. 2,739,891; a maleoprimarate of U.S. Pat. No. 2,823,123; and amino acid of U.S. Pat. No. 3,038,804; a sulfosuccinamate of U.S. Pat. No. 2,992,108; or a polyether of U.S. Pat. No. 2,600,831; or a gelatin plasticizer such as glycerin; a dihydroxyalkane of U.S. Pat. No. 2,960,404; a bis-glycolic acid ester of U.S. Pat. No. 2,904,434; a succinate of U.S. Pat. No. 2,940,854; or a polymeric hydrosol of U.S. Pat. No. 2,852,386.

As the binder for the respective emulsion strata, the aforementioned gelatin may be, in whole or in part, replaced with some other colloidal material such as albumin; casein; or zein; or resins such as a cellulose derivative, as described in U.S. Pats. Nos. 2,322,085 and 2,327,808; polyacrylamides, as described in U.S. Pat. No. 2,541,474; vinyl polymers such as described in U.S. Pats. Nos. 2,253,078; 2,276,322; 2,276,323; 2,281,703; 2,310,223; 2,311,058; 2,311,059; 2,414,208; 2,461,023; 2,484,456; 2,538,257; 2,579,016; 2,614,931; 2,624,674; 2,632,704; 2,642,420; 2,678,884; 2,691,582; 2,725,296; 2,753,264; and the like.

Although the preceding description of the invention has been couched in terms of the preferred photosensitive component construction wherein at least two selectively sensitized photosensitive starta are in contiguous coplanar relationship and, specifically, in terms of the preferred tripack type structure comprising a red-sensitive silver halide emulsion stratum, a green-sensitive silver halide emulsion stratum and a blue-sensitive silver halide emulsion stratum having associated therewith, respectively, a cyan dye developer, a magenta dye developer and a yellow dye developer, the photosensitive component of the film unit may comprise at least two sets of selectively sensitized minute photosensitive elements arranged in the form of a photosensitive screen wherein each of the minute photosensitive elements has associated therewith, for example, an appropriate dye developer in or behind its respective silver halide emulsion portion. In general, a suitable photosensitive screen will comprise minute red-sensitized emulsion elements, minute green-sensitive emulsion elements and minute blue-sensitized emulsion elements arranged in side-by-side relationship in a screen pattern and having associated therewith, respectively, a cyan, a magenta and a yellow dye developer.

The present invention also includes the employment of a black dye developer and the use of a mixture of dye developers adapted to provide a black and white transfer image, for example, the development of dye developers of the three subtractive colors in an appropriate mixture in which the quantities of the dye developers are proportioned such that the colors combine to provide black.

Where in the specification, the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image," assume that the photosensitive element is exposed to actinic light through a negative transparency. In this case, the latent image in the photosensitive emulsion layer will be a positive and the dye image produced on the image-carrying layer will be a negative. The expression "positive image" is intended to cover such an image produced on the image-carrying layer.

It will be recognized that, by reason of the preferred film unit's structural parameters, the transfer image formed upon direct exposure of the film unit to a selected subject and processing, will be a geometrically reversed image of the subject. Accordingly, to provide transfer image formation geometrically nonreversed, exposure of such film unit should be accomplished through an image reversing optical system such a camera possessing an image reversing optical system.

In addition to the described essential layers, it will be recognized that the film unit may also contain one or more subcoats or layers, which, in turn, may contain one or more additives such as plasticizers, intermediate essential layers for the purpose, for example, of improving adhesion, and that any one or more of the described layers may comprise a composite of two or more strata of the same, or different, components and which may be contiguous, or separated from, each other, for example, two or more neutralizing layers of the like, one of which may be disposed intermediate the cyan dye image-forming component retaining layer and the dimensionally stable opaque layer.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A photographic film unit which is adapted to be processed by passing said unit between at least one pair of juxtaposed pressure-applying members and which comprises, in combination:

a photosensitive element comprising a composite structure containing, as essential layers, in sequence, a first dimensionally stable, liquid impermeable layer opaque to incident actinic radiation; a photosensitive silver halide emulsion layer having associated therewith a dye image-forming material which is soluble and diffusible, in processing composition, as a function of the point-to-point degree of exposure of said photosensitive silver halide emulsion layer to incident actinic radiation; a polymeric layer dyeable by said dye image-providing material; a second dimensionally stable, liquid impermeable layer transparent to incident actinic radiation; and means securing said layers in substantially fixed relationship; and rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first and second compositions in order, layerwise, intermediate the emulsion layer and dyeable polymeric layer next adjacent said first and second compositions, taken together, possessing a solvent concentration and pH at which said dye image-forming material is soluble and diffusible and said opacifying and reflecting agents, taken together, present in a quantity sufficient, upon distribution, to mask dye image-providing material associated with said emulsion layer and to prevent exposure of said emulsion layer during processing in the presence of radiation actinic thereto and incident on said second dimensionally stable liquid impermeable transparent layer.

2. A photographic film unit as defined in claim 1 wherein said first dimensionally stable layer is transparent to incident actinic radiation.

3. A photographic film unit as defined in claim 1 including an alkaline solution permeable polymeric sheet extending intermediate said dyeable polymeric layer and said photosensitive silver halide emulsion layer next adjacent and said rupturable container means mounted to effect unidirectional discharge of said first composition intermediate said polymeric sheet and the photosensitive silver halide emulsion layer next adjacent and said second composition intermediate said polymeric sheet and the dyeable polymeric layer next adjacent.

4. A photographic film unit as defined in claim 1 wherein said rupturable container means comprise a single rupturable container possessing separate compartments retaining, respectively, said first and said second compositions.

5. A photographic film unit as defined in claim 1 wherein said rupturable container means comprise separate containers retaining, respectively, said first and second compositions.

6. A photographic film unit as defined in claim 1 wherein said dye image-providing material is a dye which is a silver halide developing agent.

7. A photographic film unit as defined in claim 1 wherein said reflecting agent is titanium dioxide.

8. A photographic film unit as defined in claim 1 wherein said opacifying agent is carbon black.

9. A photographic film unit as defined in claim 1 wherein said titanium dioxide is present, upon distribution, in a concentration sufficient to provide reflectance of at least about 85% of the actinic radiation incident on the layer comprising said titanium dioxide.

10. A photographic film unit as defined in claim 1 wherein at least one of said first and said second processing compositions additionally contains a film-forming polymeric material.

11. A photographic film unit as defined in claim 1 wherein said film-forming polymeric material is hydroxyethyl cellulose.

12. A photographic film unit as defined in claim 1 wherein said photosensitive element comprises at least two selectively sensitized silver halide emulsion layers each having a dye which dye is a silver halide developing agent of predetermined color associated therewith.

13. A photographic film unit as defined in claim 12 wherein each of said selectively sensitized photosensitive silver halide emulsions has predominant spectral sensitivity to separate regions of the spectrum and the dye associated with each of said silver halide emulsion layers possesses a spectral absorption range subsequent to processing substantially complementary to the predominant sensitivity range of its associated emulsion layer.

14. A photographic film unit as defined in claim 13 wherein each of said silver halide emulsion layers and its associated dye is separated from the next adjacent silver halide emulsion layer and its associated dye by an alkaline solution permeable polymeric interlayer.

15. A photographic film unit as defined in claim 12 wherein at least one of said dyes is disposed in a separate alkaline solution permeable polymeric layer adjacent its associated silver halide emulsion layer intermediate said emulsion layer and said dimensionally stable opaque layer.

16. A photographic film unit as defined in claim 1 including at least one polymeric acid layer positioned intermediate at least one of said first dimensionally stable layers and the photosensitive silver halide emulsion layer next adjacent thereto, and said second dimensionally stable layer and the dyeable polymeric layer next adjacent thereto.

17. A photographic film unit as defined in claim 16 wherein said polymeric acid layer contains sufficient acidifying groups to effect reduction of said processing solution from a first pH at which said dye is substantially soluble and diffusible to a second pH at which said dye is substantially insoluble and nondiffusible.

18. A photographic film unit as defined in claim 1 wherein said dye image-forming material is soluble and diffusible in processing composition at a first solvent concentration, and wherein said first and said second dimensionally stable layers, taken together, possess a processing composition solvent vapor permeability sufficient to effect subsequent to substantial dye transfer image formation by diffusion transfer processing and preceding substantial environmental dye transfer image degradation, osmotic transpiration of processing composition solvent in a quantity effective to decrease said first solvent concentration at which said dye image-forming material is soluble and diffusible to a second solvent concentration at which said dye image-forming material is substantially nondiffusible.

19. A photographic film unit as defined in claim 18 wherein said dye image-providing material is a dye which is a silver halide developing agent, and wherein said dye is substantially soluble and diffusible only in the reduced form at said first solvent concentration and is substantially nondiffusible in said reduced form at said second solvent concentration.

20. A photographic film unit as defined in claim 19 wherein said liquid impermeable, dimensionally stable layers comprise flexible polymeric sheet materials which possess a water vapor transmission rate at ambient temperatures and pressures averaging not less than about 1 gram of water/24 hrs./100 in.²/mil. thickness.

21. A photographic film unit as defined in claim 20 wherein said liquid impermeable, dimensionally stable layers comprise flexible polymeric sheet materials which possess a water vapor transmission rate at ambient temperatures and pressures averaging not less than about 100 grams of water/24 hrs./100 in.²/mil. thickness.

22. A photographic film unit as defined in claim 21 wherein at least one of said flexible polymeric sheet materials comprises liquid impermeable, water vapor permeable cellulose triacetate possessing a water vapor transmission rate at ambient temperatures and pressures averaging not less than about 300 grams of water/24 hrs./100 in.²/mil. thickness.

23. A photographic film unit as defined in claim 21 wherein at least one of said polymeric sheet materials comprises liquid impermeable, water vapor permeable polyester possessing a water vapor transmission rate at ambient temperatures and pressures averaging not less than about 300 grams of water/24 hrs./100 in.²/mil. thickness.

24. A photographic film unit as defined in claim 1 including means for interposing a continuous dye image-forming material impermeable polymeric layer subsequent to substantial image formation in said dyeable polymeric layer, intermediate said dyeable polymeric layer and the photosensitive silver halide emulsion next adjacent thereto.

25. A photographic film unit, as defined in claim 1 which is adapted to be processed by passing said unit between at least one pair of juxtaposed pressure-applying members and which includes, in combination:
   a photosensitive element comprising a composite structure containing, as essential layers, in sequence, a dimensionally stable alkaline solution impermeable opaque layer, at least two selectively sensitized silver halide emulsion layers each having a dye, which dye is a silver halide developing agent, of predetermined color associated therewith, each of said dyes soluble and diffusible, in processing composition, as a function of the point-to-point degree of exposure of said photosensitive silver halide emulsion layer to incident actinic radiation, an alkaline solution permeable transparent polymeric sheet, an alkaline solution permeable transparent polymeric layer dyeable by said dyes, a second dimensionally stable alkaline solution impermeable transparent layer, and means securing said layers in fixed relationship; and
   rupturable container means separately retaining first and second aqueous processing compositions said first composition containing dispersed therein a substantially nondiffusible opacifying agent and said second composition containing dispersed therein a substantially nondiffusible reflecting agent, fixedly positioned and extending transverse a leading edge of said photosensitive element to effect unidirectional discharge of said first composition intermediate said photosensitive emulsion layer and transparent polymeric sheet and said second composition intermediate said dyeable polymeric layer and said transparent polymeric sheet, said first and second compositions, taken together, possessing a solvent concentration and pH at which said dye image-forming material is soluble and diffusible and said opacifying and reflecting agents, taken together, present in a concentration sufficient, upon distribution, to mask dye material associated with said emulsion layer and to prevent exposure of said emulsion layer during processing in the presence of radiation actinic thereto and incident on said dimensionally stable transparent layer.

26. A photographic film unit as defined in claim 12 which is adapted to be processed by passing said unit between at least one pair of juxtaposed pressure-applying members and which comprises, in combination:
   a composite structure containing, as essential layers, in sequence, a dimensionally stable, liquid impermeable opaque layer; an alkaline solution permeable polymeric layer containing cyan dye; a red-sensitive silver halide emulsion layer; an alkaline solution permeable polymeric layer containing magenta dye; a green-sensitive silver halide emulsion layer; an alkaline solution permeable polymeric layer containing yellow dye; a blue-sensitive silver halide emulsion layer; each of said cyan, magenta and yellow dyes being silver halide developing agents and being soluble and diffusible, in an aqueous alkaline solution at a first pH; an alkaline solution permeable transparent polymeric layer dyeable by said dyes; an alkaline solution permeable transparent polymeric acid layer containing sufficient acidifying groups to effect reduction of a processing solution having said first pH to a second pH at which said dyes are insoluble and nondiffusible; a dimensionally stable, liquid impermeable transparent layer; and means securing said layers in substantially fixed relationship; and
   rupturable container means separately retaining first and second aqueous processing compositions, said first composition containing dispersed therein an opacifying agent and said second composition containing dispersed therein a reflecting agent, adapted to effect unidirectional discharge of said first and second compositions intermediate said blue-sensitive silver halide emulsion layer and said dyeable polymeric layer, said first and second compositions, taken together, possessing said first pH and present in a quantity sufficient upon distribution to mask said dyes associated with said emulsion layers and to prevent exposure of said emulsion layers during processing in the presence of radiation actinic thereto and incident on said dimensionally stable transparent layer.

27. A photographic film unit as defined in claim 26 wherein said first pH is above 9 and said second pH is below 9.

28. A photographic film unit as defined in claim 26 including an alkaline solution permeable polymeric sheet extending intermediate said dyeable polymeric layer and said blue-sensitive silver halide emulsion layer and said rupturable container means are mounted to effect unidirectional discharge of said first composition intermediate said blue-sensitive silver halide emulsion layer and said polymeric sheet and said second composition intermediate said dyeable polymeric layer and said polymeric sheet.

29. A process for forming transfer images in color which comprises, in combination, the steps of:
   (a) exposing a photographic film unit which is adapted to be processed by passing the unit between at least one pair of juxtaposed pressure-applying members and which includes, in combination, a composite structure comprising a first dimensionally stable, liquid impermeable layer opaque to incident actinic radiation; a photosensitive silver halide emulsion layer having associated therewith a dye image-forming material which is soluble and diffusible, in processing composition, as a function of the point-to-point degree of exposure of said photosensitive silver halide emulsion layer to incident actinic radiation; a polymeric layer dyeable by said dye image-providing material; a second dimensionally stable, liquid impermeable layer transparent to incident actinic radiation; and means securing said layers in substantially fixed relationship; and
   rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first and second compositions, in order, layerwise, intermediate the emulsion layer and adjacent dyeable polymeric layer, said first and second compositions, taken together, possessing a solvent concentration and pH at which said dye image-forming material is soluble and diffusible and said opacifying and reflecting agents, taken together, present in a concentration effective, upon distribution, to mask dye image-forming material associated with said emulsion layer and to prevent exposure of said emulsion layer during processing in the presence of radiation actinic thereto and incident on said dimensionally stable transparent layer;

(b) applying compressive force to said rupturable container means to effect said undirectional discharge of said first and second compositions, in order, layerwise, intermediate the emulsion layer and adjacent dyeable polymeric layer;

(c) effecting thereby distribution of said opacifying and reflecting agents as substantially separate layers intermediate said emulsion layer and adjacent dyeable polymeric layer in a concentration areawise effective to mask dye image-forming material associated with the emulsion layer and to prevent exposure of said emulsion layer during processing in the presence of radiation actinic thereto and incident on said dimensionally stable transparent layer, and development of said emulsion layer;

(d) forming, as a result of said development, an imagewise distribution of mobile dye image-providing material associated with said emulsion, as a function of the point-to-point degree of emulsion exposure;

(e) transferring, by diffusion, at least a portion of said imagewise distribtuion of mobile dye image-providing material to said alkaline solution permeable polymeric layer dyeable by said dye image-providing material to provide a dye image thereto in terms of said imagewise distribution; and (f) maintaining said composite structure intact subsequent to said processing.

30. A process as defined in claim 29 wherein said first dimensionally stable layer is transparent to actinic radiation.

31. A process as defined in claim 29 wherein said first and second compositions are discharged substantially simultaneously intermediate said emulsion layer and adjacent dyeable polymeric layer.

32. A process as defined in claim 29 wherein said first and second compositions are discharged sequentially intermediate said emulsion layer and adjacent dyeable polymeric layer.

33. A process as defined in claim 29 including the step of separating said container means from said composite structure subsequent to substantial transfer image formation.

34. A process as defined in claim 29 wherein at least one of said first and second compositions additionally contains a film-forming polymeric material.

35. A process as defined in claim 34 wherein said film-forming polymeric material is hydroxyethyl cellulose.

36. A process as defined in claim 29 wherein said dye image-providing material is a dye which is a silver halide developing agent.

37. A process as defined in claim 29 wherein said reflecting agent is titanium dioxide.

38. A process as defined in claim 29 wherein said opacifying agent is carbon black.

39. A process as defined in claim 37 wherein said titanium dioxide is present, upon distribution, in a concentration effective to provide reflectance of at least about 85% of the actinic radiation incident on the layer comprising said titanium dioxide.

40. A process as defined in claim 29 wherein said liquid impermeable, dimensionally stable layers comprise flexible polymeric sheet materials which possess a water vapor transmission rate at ambient temperatures and pressures averaging not less than about 1 gram of water/24 hrs./100 in.$^2$/mil. thickness.

41. A process as defined in claim 40 wherein said liquid impermeable, dimensionally stable layers comprise flexible polymeric sheet materials which possess a water vapor transmission rate at ambient temperatures and pressures averaging not less than about 100 grams of water/24 hrs./100 in.$^2$/mil. thickness.

42. A process as defined in claim 41 wherein at least one of said flexible polymeric sheet materials comprises liquid impermeable, water permeable cellulose triacetate possessing a water vapor transmission rate at ambient temperatures and pressures averaging not less than about 300 grams of water/24 hrs./100 in.$^2$/mil. thickness.

43. A process as defined in claim 41 wherein at least one of said polymeric sheet materials comprises liquid impermeable, vapor permeable polyester possessing a water vapor transmission rate at ambient temperatures and pressures averaging not less than about 300 grams of water/24 hrs./100 in.$^2$/mil. thickness.

44. A process as defined in claim 29 wherein said composite structure includes at least one polymeric acid layer positioned intermediate at least one of said first dimensionally stable layer and the next adjacent photosensitive silver halide layer, and said second dimensionally stable layer and the next adjacent dyeable polymeric layer and said polymeric acid layers containing sufficient acidifying groups to effect reduction of an alkaline processing solution possessing a first pH at which said dyes are substantially soluble and diffusible to a second pH at which said dyes are substantially insoluble and nondiffusible and including the step of transferring, by diffusion, subsequent to substantial transfer image formation, a sufficient portion of the ions of said alkaline processing solution to said polymeric acid layers to thereby reduce the alkalinity of said solution from said first pH to said second pH.

45. A process as defined in claim 29 wherein said composite structure includes means for interposing a dye image-forming material impermeable polymeric layer intermediate said dyeable polymeric layer and the photosensitive silver halide emulsion layer next adjacent thereto, subsequent to substantial dye transfer image formation and preceding substantial environmental dye transfer image degradation.

46. A process of forming transfer images, in color, as defined in claim 29 which comprises, in combination, the steps of:

(a) exposing a photographic film unit which is adapted to be processed by passage through at least one pair of juxtaposed pressure-applying members and which includes, in combination, a composite structure comprising a first dimensionally stable, liquid impermeable layer opaque to incident actinic radiation; at least two selectively sensitized silver halide emulsion layers, each of said silver halide emulsions having associated therewith a dye, which is a silver halide developing agent, of predetermined color, and is soluble and diffusible, in processing composition, as a function of the point-to-point degree of exposure of said photosensitive silver halide emulsion layer to incident actinic radiation; a polymeric layer dyeable by said dye; a second dimensionally stable, liquid impermeable layer transparent to incident actinic radiation; and means securing said layers in substantially fixed relationship; and rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first and second compositions as substantially separate layers intermediate the emulsion layer and the dyeable polymeric layer, said first and second compositions, taken together, possessing a solvent concentration and pH at which said dye image-forming material is soluble and diffusible and said opacifying and reflecting agents, taken together, present in a concentration effective, upon distribution, to mask dye image-forming material associated with said emulsion layer and to prevent exposure of said emulsion layer during processing in the presence of radiation actinic thereto and incident on said dimensionally stable transparent layer;

(b) applying compressive force to said rupturable container means to effect said unidirectional discharge of said first and second compositions in order, layerwise, intermediate the emulsion layer and the dyeable polymeric layer;

(c) effecting thereby distribution of said opacifying and reflecting agents as substantially separate layers intermediate said emulsion layer and adjacent dyeable polymeric layer in a concentration areawise effective to mask dye image-forming material associated with the emulsion layer and to prevent exposure of said emulsion layer during processing in the presence of radiation actinic thereto and incident on said dimensionally stable transparent layer, and development of said emulsion layer;

(d) immobilizing the dye associated with each of said emulsions as a result of development;

(e) forming an imagewise distribution of mobile dye as a function of the point-to-point degree of emulsion exposure;

(f) transferring, by imbibition, at least a portion of each of said imagewise distributions of mobile dye to said alkaline solution permeable polymeric layer dyeable by said dyes to provide thereto a dye image; and (g) maintaining said composite structure intact subsequent to said processing.

47. A process as defined in claim 46 wherein said photographic film unit includes an alkaline solution permeable polymeric sheet extending intermediate said dyeable polymeric layer and said emulsion layer, said rupturable container means being mounted to effect unidirectional discharge of said first composition intermediate said emulsion layer and said polymeric sheet and said second composition intermediate said dyeable polymeric layer and said polymeric sheet.

48. A process as defined in claim 46 wherein each of said selectively sensitized silver halide emulsion layers possess predominant spectral sensitivity to a separate region of the spectrum and the dye associated with each of said emulsion layers possesses a spectral absorption range subsequent to processing substantially complementary to the predominant sensitivity range of its associated emulsion.

49. A process of forming transfer images in color as defined in claim 44 which comprises, in combination, the steps of:

(a) exposing a photographic film unit which is adapted to be processed by passing said unit between at least one pair of juxtaposed pressure-applying members and which includes, in combination, a photosensitive element comprising a laminate containing, as essential layers, in sequence, a dimensionally stable alkaline solution impermeable opaque layer; a red-sensitive silver halide emulsion layer having associated therewith cyan dye; a green-sensitive silver halide emulsion layer having associated therewith magenta dye; a blue-sensitive silver halide emulsion layer having associated therewith yellow dye; each of said cyan, magenta and yellow dyes being silver halide developing agents and soluble and diffusible in aqueous alkaline solution at a first pH; an alkaline solution permeable transparent polymeric layer dyeable by said dyes; an alkaline solution permeable transparent polymeric acid layer containing sufficient acidifying groups to effect reduction of an alkaline processing solution having said first pH to a second pH at which said dyes are substantially insoluble and nondiffusible; a dimensionally stable, alkaline solution impermeable transparent layer; and means securing said layers in fixed relationship; and rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first and second compositions as substantially separate layers intermediate said blue-sensitive emulsion layer and said dyeable polymeric layer, said first and second compositions, taken together, possessing said first pH and said opacifying and reflecting agents, taken together, present in a concentration effective, upon distribution, to mask dye image-forming material associated with said emulsion layer and to prevent exposure of said emulsion layer during processing in the presence of radiation actinic thereto and incident on said dimensionally stable transparent layer;

(b) applying compressive force to said rupturable container means to effect said unidirectional discharge of said first and second compositions in order, layerwise, intermediate said emulsion layer and said dyeable polymeric layer;

(c) effecting thereby distribution of said opacifying and reflecting agents as substantially separate layers intermediate said blue-sensitive emulsion layer and adjacent dyeable polymeric layer in a concentration areawise effective to mask dye image-forming material associated with the emulsion layer and to prevent exposure of said emulsion layer during processing in the presence of radiation actinic thereto and incident on said dimensionally stable transparent layer, and development of the latent images contained in each of said silver halide emulsions;

(d) immobilizing said yellow, magenta and cyan dye, as a result of development of their respective associated silver halide emulsions;

(e) forming thereby an imagewise distribution of mobile yellow, magenta and cyan dye, as a function of the point-to-point degree of exposure of their respective associated silver halide emulsions;

(f) transferring, by diffusion, at least a portion of each of said imagewise distributions of mobile dye to said alkaline solution permeable polymeric layer dyeable by said dyes to provide thereto a multicolor dye image;

(g) transferring, by diffusion, subsequent to substantial transfer image formation, a sufficient portion of the ions of said aqueous alkaline solution to said alkaline solution permeable polymeric acid layer to thereby reduce the alkalinity of said solution from said first pH at which said dyes are soluble and diffusible to said second pH at which said dyes are substantially nondiffusible; and (h) maintaining said laminate intact subsequent to said processing.

50. A process as defined in claim 49 wherein said first pH is above 9 and said second pH is below 9.

51. A process as defined in claim 49 wherein said first and second compositions are discharged simultaneously intermediate said blue-sensitive emulsion layer and said dyeable polymeric layer.

52. A process as defined in claim 49 wherein said first and second compositions are discharged sequentially intermediate said blue-sensitive emulsion layer and said dyeable polymeric layer.

53. A process as defined in claim 49 wherein said photographic film unit includes an alkaline solution permeable polymeric sheet extending intermediate said dyeable polymeric layer and said blue-sensitive emulsion layer, said rupturable container means being mounted to effect unidirectional discharge of said first composition intermediate said blue-sensitive emulsion layer and said polymeric sheet and said second composition intermediate said dyeable polymeric layer and said polymeric sheet.

54. A process as defined in claim 49 including the step of separating said container from said laminate subsequent to substantial image formation.

References Cited

UNITED STATES PATENTS 2,647,049   7/1953   Land _____ 96—76CX

NORMAN G. TORCHIN, Primary Examiner

A. T. SURO PICO, Assistant Examiner

U.S. Cl. X.R.

96—29, 76

Disclaimer 3,576,626.—*Terry W. Milligan*, Belmont, and *Richard W. Young*, Wellesley Hills, Mass. PHOTOGRAPHIC COLOR DIFFUSION TRANSFER PROCESSES AND FILM UNIT FOR USE THEREIN. Patent dated Apr. 27, 1971. Disclaimer filed Mar. 29, 1972, by the assignee, *Polaroid Corporation*.

Hereby enters this disclaimer to the portion of the term of the patent subsequent to Oct. 21, 1986.

[*Official Gazette July 18, 1972.*]